(12) United States Patent
Kawasaki

(10) Patent No.: US 7,589,891 B2
(45) Date of Patent: Sep. 15, 2009

(54) LASER SCANNING TYPE FLUORESCENT MICROSCOPE

(75) Inventor: Kenji Kawasaki, Hachioji (JP)

(73) Assignee: Olympus Corporation, Tokyo (JP)

(*) Notice: Subject to any disclaimer, the term of this patent is extended or adjusted under 35 U.S.C. 154(b) by 199 days.

(21) Appl. No.: 10/579,975

(22) PCT Filed: Nov. 24, 2004

(86) PCT No.: PCT/JP2004/017374

§ 371 (c)(1),
(2), (4) Date: May 23, 2006

(87) PCT Pub. No.: WO2005/052668

PCT Pub. Date: Jun. 9, 2005

(65) Prior Publication Data

US 2007/0153367 A1    Jul. 5, 2007

(30) Foreign Application Priority Data

Nov. 26, 2003 (JP) .............................. 2003-395391

(51) Int. Cl.
*G02B 21/00* (2006.01)
(52) U.S. Cl. .................... 359/368; 359/389; 250/458.1
(58) Field of Classification Search .................... None
See application file for complete search history.

(56) References Cited

U.S. PATENT DOCUMENTS

| | | | |
|---|---|---|---|
| 5,612,818 A | * | 3/1997 | Kumagai et al. ............ 359/385 |
| 6,282,020 B1 | * | 8/2001 | Ogino ......................... 359/385 |
| 6,690,511 B2 | * | 2/2004 | Engelhardt et al. .......... 359/385 |
| 2004/0159797 A1 | * | 8/2004 | Wolleschensky ......... 250/458.1 |
| 2005/0122576 A1 | * | 6/2005 | Yonetani et al. ............. 359/370 |

FOREIGN PATENT DOCUMENTS

| | | |
|---|---|---|
| JP | 2001-059939 | 3/2001 |
| JP | 2002-221663 | 8/2002 |
| JP | 2003-029153 | 1/2003 |

* cited by examiner

*Primary Examiner*—Lee Fineman
(74) *Attorney, Agent, or Firm*—Kenyon & Kenyon LLP

(57) ABSTRACT

A laser scan type fluorescence microscope includes a laser light source section, an objective optical system for condensing excitation light from the laser light source section on a sample, a scanning device to scan a surface of the sample with the excitation light from the laser light source section, a pupil projection lens arranged between the scanning device and the objective optical system, a detection optical system for detecting fluorescence that emanates from the sample and passes the objective optical system and the pupil projection lens. The objective optical system has an objective lens and an image forming lens for forming an intermediate image of the sample, and a back focal position of the objective lens is made conjugate with a position near the scanning device by the image forming lens and the pupil projection lens, wherein the following condition is satisfied: $0.15 \leq D/L \leq 0.5$, where D is a parfocal distance of the objective lens, and L is a distance from the sample surface to the position conjugate with the back focal position of the objective lens and located near the scanning device.

13 Claims, 9 Drawing Sheets

LASER SCANNING TYPE FLUORESCENT MICROSCOPE

This is a 371 national phase application of PCT/JP2004/017374 filed 24 Nov. 2004, claiming priority to Japanese Patent Application No. JP 2003-395391 filed 26 Nov. 2003, the contents of which are incorporated herein by reference.

TECHNICAL FIELD

The present invention relates to a laser scan type fluorescence microscope used for a fluorescence observation or a confocal fluorescence observation in applications such as function elucidation or imaging of cells.

BACKGROUND ART

Conventionally, in this kind of laser scan type fluorescence microscope, a picture has been obtained by detecting light emanated from a sample wherein laser light condensed at a minute spot domain of the sample is scanned by scanning means, such as Galvano mirror, in addition to general observation of a microscope.

FIG. 1 is an outline block diagram showing one conventional example of a laser scan type confocal fluorescence microscope.

The laser scan type confocal fluorescence microscope of FIG. 1 comprises a laser light source section 51, an objective optical system 53 which condenses excitation light from a laser light source section 51 on a sample 52, a scanning means 54 which scans a surface of the sample 52 with the excitation light from the laser light source section 51, a pupil projection lens 55 arranged between the scanning means 54 and the objective optical system 53, a detection optical system 56 for detecting fluorescence which emanates from the sample 52 and passes the objective optical system 53 and the pupil projection lens 55.

The laser light source section 51 has a laser light source 51a, a collimating optical system including lenses 51b and 51d and a pinhole 51c, and a dichroic mirror 51e.

The objective optical system 53 has an objective lens 53a and an image forming lens 53b for forming an intermediate image of the sample 52. Moreover, a back focal position of the objective lens 53a is made conjugate with a position near the scanning means 54 by the image forming lens 53b and the pupil projection lens 55.

The scanning means 54 is configured as a proxy type Galvano mirror having Galvano mirrors 54a and 54b.

The detection optical system 56 has a dichroic mirror 56a, a barrier filter 56b, a lens 56c, and a confocal pinhole 56d and a light receiving optical sensor 56e, such as a photomultiplier.

Furthermore, the microscope of FIG. 1 has a dichroic mirror 57 which leads the fluorescence from the sample 52 to the detection means 56 while leading the excitation light from the light source section 51 to the sample 52, a mirror 59 which deflects the light transmitted through the pupil projection lens 55 to the image forming lens 53b, an eyepiece optical system 60 for observing the image of the sample 52, and a fluorescence lighting optical system 61 used in normal fluorescence observation.

Thus, in the laser scan type confocal fluorescence microscope as constituted in FIG. 1, the excitation light emanating from the laser light source 51a is condensed at the pinhole 51c by the lens 51b, and then is converted into a beam of parallel rays by the lens 51d. Then, this excitation light is led to the proxy type Galvano mirror section, which is the scanning means 54, via dichroic mirrors 51e and 57, and the beam of rays of it is shifted two dimensionally in reference to the optical axis by each rotation of Galvano mirrors 54a and 54b, to be formed as a primary image as being focused on the intermediate image position 58 through the pupil projection lens 55. The excitation light condensed at the intermediate image position 58 is incident on the sample 52 at a minute spot via the mirror 59, the image forming lens 53b, and the objective lens 53a. At this time, the surface of the sample 52 is scanned with the excitation light by the scanning means 54.

The back focal position of the objective lens 53a is projected by the image forming lens 53b and the pupil projection lens 55 near the proxy type Galvano mirror which is the scanning means 54.

Fluorescence excited on the sample 52 by irradiation with the excitation light is led to the detection optical system 56 via the objective lens 53a, the image forming lens 53b, the pupil projection lens 55, the scanning means 54, and the dichroic mirror 57. Then, a wavelength separation is carried out by the dichroic mirror 56a, and only fluorescence that passes through the confocal pinhole via the barrier filter 56b and the lens 56c is detected by the light receiving optical sensor 56e, such as a photomultiplier.

In carrying out a normal fluorescence observation through the eyepiece optical system 60, a fluorescence lighting optical system 61 equipped with a different light source 61a from the laser light source 51a is used. Excitation light emanating from the light source 61a is transmitted through a lens 61b and a filter 61c, is reflected by the dichroic mirror 61d, and illuminates the sample 52 through the objective lens 53a. Fluorescence excited on the sample 52 by irradiation with the excitation light is condensed by the objective lens 53a, is subjected to wavelength separation by the dichroic mirror 61d arranged in the fluorescence lighting optical system 61, and is observed via the prism 60a and the eyepiece 60b of the eyepiece optical system 60 through the barrier filter 61e.

Such a conventional laser-scan-type confocal fluorescence microscope is excellent in resolution, and it has an advantage that light from other than a minute spot to be observed can be eliminated. Thus, it is useful for carrying out an intracellular functional elucidation etc.

However, in the laser scan type confocal fluorescence microscope, the equipment itself becomes large since it is necessary to add an optical system such as a pupil projection lens 55 and a scanning means 54 mentioned above etc., in addition to an optical system used for a normal fluorescence observation, such as an objective lens 53a and an image forming lens 53b.

That is, generally as for the optical system of a laser-scan type confocal fluorescence microscope, the focal length of an image forming lens is such long as around 180 mm. Consequently, a total length from a sample to the scanning means arranged near a conjugate position of a pupil of an objective lens becomes 400-500 mm, to enlarge the whole equipment.

For this reason, a confocal fluorescence observation and a fluorescence observation become possible only in case that the sample is arranged on a stage of a microscope.

Moreover, when a confocal fluorescence observation is actually performed to a rat, a small animal or a cell under a cultivation environment where it is alive (in vivo), there is a restriction that the observation environment must be built on the stage. Furthermore, a laser scan type confocal fluorescence microscope is generally designed to perform observation in a state where the optical axis of an objective lens becomes perpendicular to a surface of the stage. Therefore, it is difficult to observe the sample from a slant direction. Moreover, it is difficult to perform observation upon leaning the whole laser scan type confocal fluorescence microscope to the sample or leaning the sample and the stage.

BRIEF SUMMARY OF THE INVENTION

The present invention is made in view of problems mentioned above, and it aims at providing a laser scan type fluorescence microscope that is small in size compared with the conventional laser scan type confocal fluorescence microscope and that can achieve observation in a state where a cell is alive (in vivo) with wavelengths from a visible region to a near-infrared region with sufficient user-friendly operation.

In order to attain the above-mentioned purpose, the laser scan type fluorescence microscope according to the present invention comprises a laser light source section, an objective optical system which condenses excitation light from the laser light source section on a sample, a scanning means which makes the excitation light from the laser light source section scan on a surface of the sample, a pupil projection lens arranged between the scanning means 54 and the objective optical system, and a detection optical system for detecting fluorescence which emanates from the sample and passes the objective optical system and the pupil projection lens. The objective optical system has an objective lens and an image forming lens for forming an intermediate image of the sample, a back focal position of the objective lens is made conjugate with a position near the scanning means by the image forming lens and the pupil projection lens, and the following condition (1) is satisfied:

$$0.15 \leq D/L \leq 0.5 \quad (1)$$

where D is parfocal distance of the objective lens, and L is a distance from the sample surface to the position conjugate with the back focal position of the objective lens and arranged near the scanning means.

The laser scan type fluorescence microscope according to the present invention is characterized in that it comprises an optical transmission means which leads the excitation light from the laser light source section to the scanning means.

In the laser scan type fluorescence microscope according to the present invention, the pupil projection lens includes two or more lens groups, wherein a lens surface arranged nearest the scanning means is concave toward the scanning-means side, and a lens surface arranged nearest the intermediate image is concave toward the intermediate image side, and the following condition (2) is satisfied:

$$0.2 \leq Fe/D3 \leq 0.5 \quad (2)$$

where D3 is a distance from the position that is conjugate with the pupil of the objective lens and is located near the scanning means to the intermediate image position of the image forming lens, and Fe is a focal length of the pupil projection lens.

The laser scan type fluorescence microscope according to the present invention comprises two or more lens groups, having at least one cemented lens having a positive lens and a negative lens, and the following conditions (3) and (4) are satisfied;

$$0.4 \leq FTL/D1 \leq 1 \quad (3)$$

$$80 \leq vp \quad (4)$$

where vp is Abbe's number of the positive lens in the cemented lens, FTL is a focal length of the image forming lens, and D1 is a distance from a shoulder of the objective lens on a body to the intermediate image position.

The laser scan type fluorescence microscope according to the present invention is characterized in that the image forming lens includes two lens groups that are a front group arranged on the intermediate image side and a rear group arranged on the objective lens side, the front group of the image forming lens has at least one negative lens, and the following conditions (5) and (6) are satisfied:

$$0.4 \leq D2/FTL \leq 1 \quad (5)$$

$$0.7 \leq FTL1/FTL \leq 1.5 \quad (6)$$

where FTL1 is a focal length of the rear group of the image forming lens, and D2 is an interval between the front group of the image forming lens and the rear group of the image forming lens.

The laser scan type fluorescence microscope according to the present invention comprises a first multi-mode fiber which leads the excitation light from the laser light source section to the scanning means, a second multi-mode fiber which leads the fluorescence from the sample to the detection optical system, a first lens by which entry of the excitation light to the first multi-mode fiber is carried out, and a second lens by which entry of the fluorescence from the sample to the detection optical system is carried out, and the following conditions (7) to (9) are satisfied:

$$2 \leq \Phi em/\Phi ex \leq 12 \quad (7)$$

$$0.61 \times (\gamma ex/NAex) < \Phi ex \quad (8)$$

$$0.61 \times (\lambda em/NAem) < \Phi em \quad (9)$$

where $\Phi ex$ is a diameter of a core of the first multi-mode fiber, $\Phi em$ is a diameter of a core of the second multi-mode fiber, NAex is a numerical aperture where entry of the excitation light to the first multi-mode fiber by the first lens is carried out, $\lambda ex$ is a wavelength of the excitation light, NAem is a numerical aperture where entry of the fluorescence to the second multi-mode fiber by the second lens is carried out, and $\lambda em$ is a wavelength of the fluorescence.

The laser scan type fluorescence microscope according to the present invention is characterized in that it comprises an optical transmission means which leads fluorescence from the sample to the detection optical system.

According to the laser scan type microscope of the present invention, by satisfying condition (1), a distance from a scanning means to the sample surface can be shortened, and the equipment can be miniaturized.

By arranging the optical transmission means between the laser optical system and the scanning means, a degree of freedom can be given to arrangement of the optical system in the main body that is from the scanning means to the objective lens, and of the laser optical system, and a miniaturized optical system in the main body suitable for observation in a state where the sample is alive (in vivo) can be provided.

By arranging the pupil projection lens, which relays a beam of parallel rays deflected by the scanning means to an intermediate image position, to include two or more lens groups with a lens surface arranged nearest the scanning means being concave toward the scanning means side and a lens surface arranged nearest the intermediate image being concave toward the intermediate image side, correction of optical performance in the intermediate image can be carried out well.

By satisfying the condition (2), miniaturization of the equipment can be achieved with a shortened distance from the scanning means to the intermediate image position, while good optical performance of the pupil projection lens is achieved.

By satisfying the condition (3), miniaturization of the equipment can be achieved with a shortened distance from the objective lens shoulder on the main body to the intermediate image position.

By satisfying the condition (4), spherical aberration and chromatic aberration on the axis, which are caused by a shortened focal length, can be well compensated for.

By constituting the image forming lens with two lens groups, compensation for aberrations can be carried out by the rear group so that aberrations produced in the front group is offset, and a laser microscope that is suitable for observation in vivo is achieved.

By satisfying the conditions (5) and (6), astigmatism, coma aberration and magnification chromatic aberration can be well compensated for.

In a constitution comprising a first multi-mode fiber which leads the excitation light from the laser light source section to the scanning means, and a second multi-mode fiber which leads fluorescence from the sample to the detection optical system, by satisfying the conditions (7) to (9), the proportion of the amount of detected fluorescence to the amount of excitation light from the light source becomes high, so that brighter fluorescence is detected. Furthermore, picture information on the thickness direction from the sample can be obtained covering a predetermined thickness. Accordingly, operation performance in observation in the state where the sample is alive (in vivo) is improved.

By arranging the optical transmission means between the pupil projecting lens and the detection optical system, a degree of freedom can be given to arrangement of the optical system in the main body that is from the pupil projecting lens to the objective lens, and of the detection optical system, and a miniaturized optical system of the main body suitable for observation in a state (in vivo) of the sample can be constituted.

Further, if the optical transmission means which leads the excitation light from the laser light source section to the scanning means and the optical transmission means which leads the fluorescence from the sample to the detection optical system are composed of separate optical fibers, respectively, the detection optical system can avoid an influence thereon by auto-fluorescence, which is generated when the excitation light enters the optical fiber, and thus can detect the fluorescence generated by the sample with high accuracy.

DETAILED DESCRIPTION OF THE INVENTION

Figure 1:
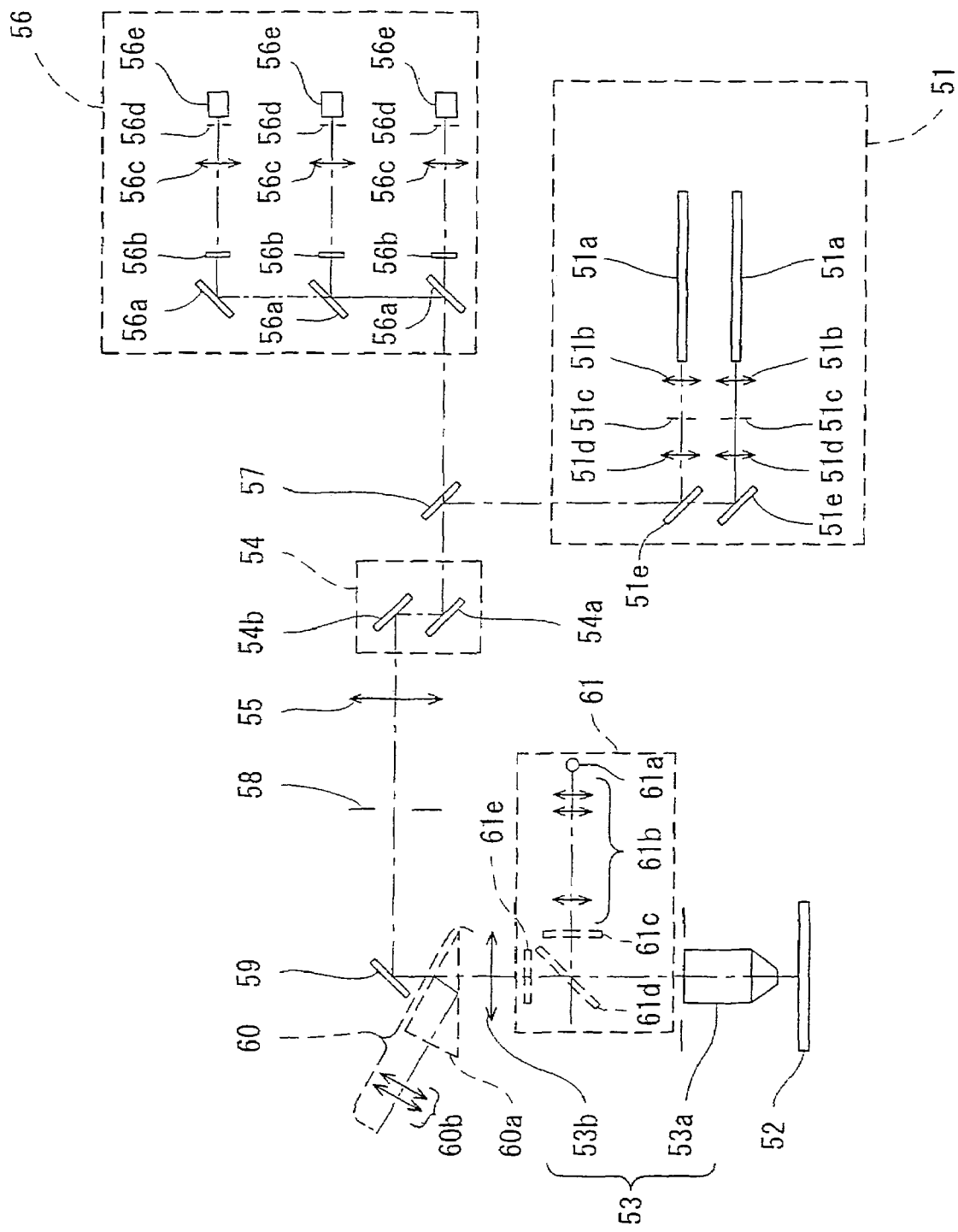
FIG. 1 is schematic configuration diagram showing one conventional example of a laser scan type confocal fluorescence microscope.
Figure 2:
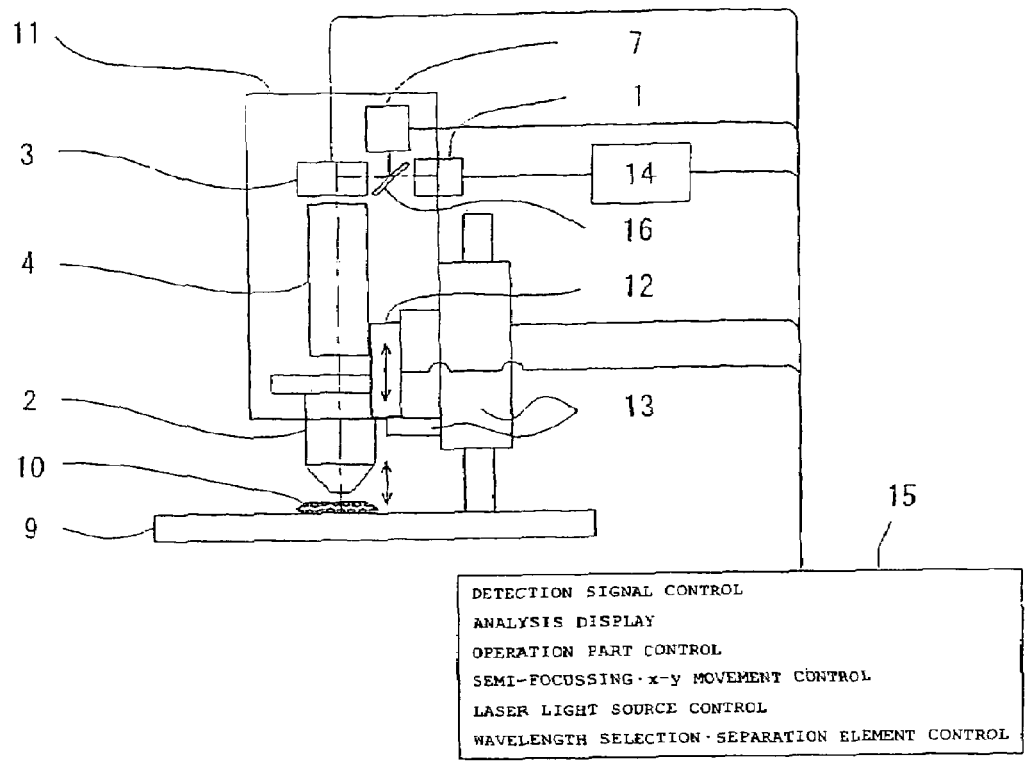
FIG. 2 is a schematic configuration diagram of a first embodiment of a laser scan type fluorescence microscope according to the present invention.
Figure 3:
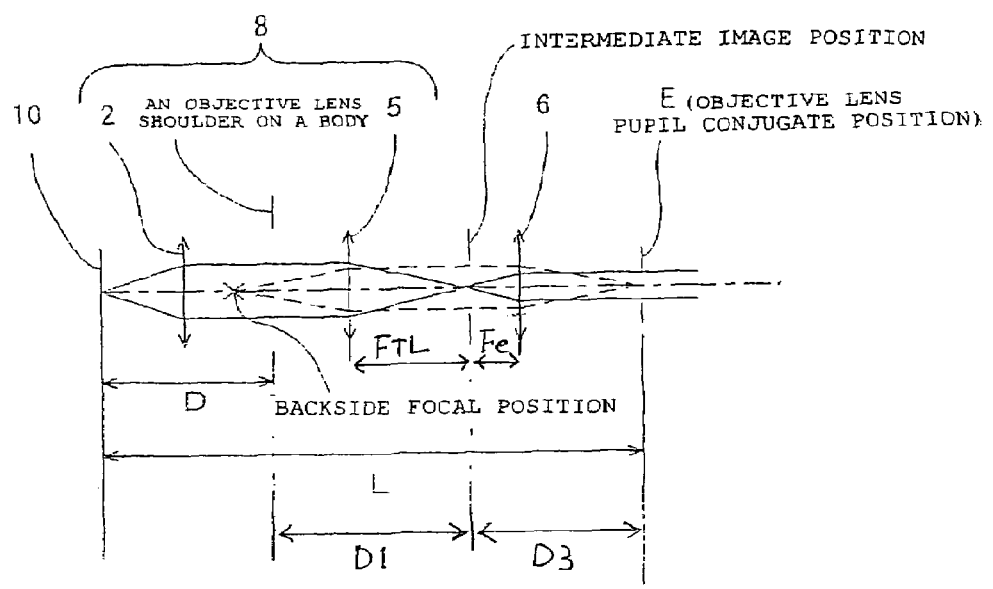
FIG. 3 is a principal-part diagram for showing a schematic configuration of the optical system arranged in the main body of the microscope of FIG. 2.
Figure 4:
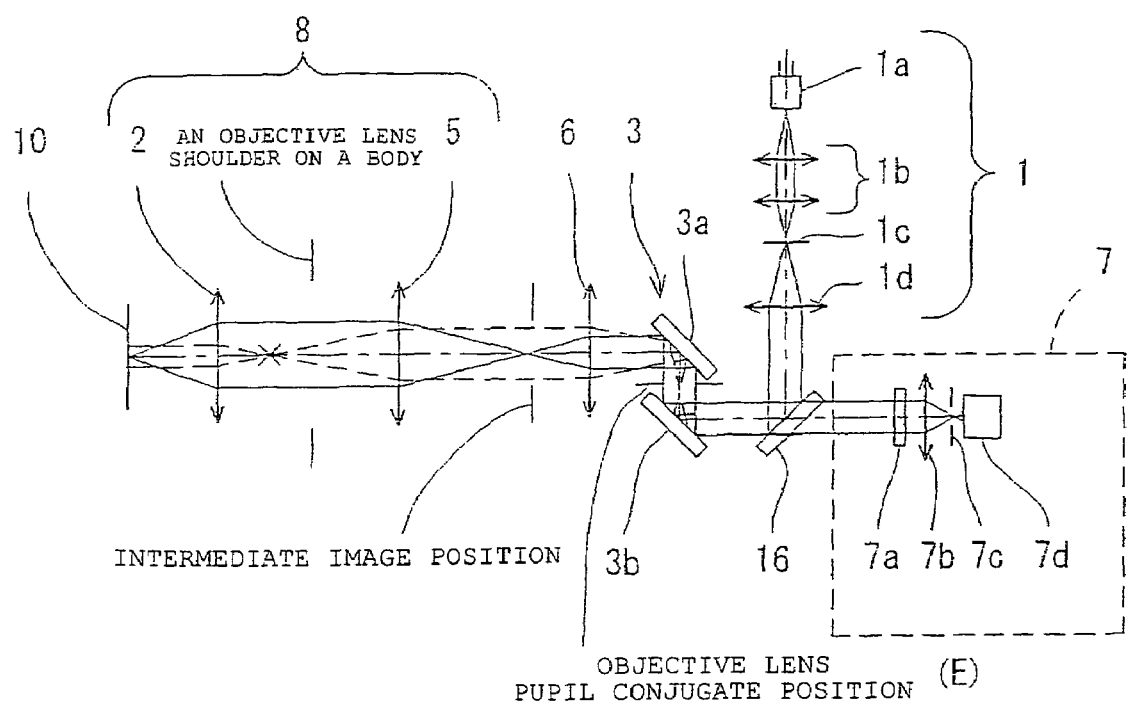
FIG. 4 is a diagram showing a configuration in which a laser light source section and a detection optical system are added to the optical system in the main body of the microscope shown in FIG. 3.

FIG. 2 is a schematic configuration diagram of the first embodiment of the laser scan type fluorescence microscope according to the present invention. FIG. 3 is a principal-part diagram for showing a schematic configuration of an optical system arranged in the main body of the microscope of FIG. 2. FIG. 4 is a diagram showing a configuration in which a laser light source section and a detection optical system are added to the optical system of the main body of the microscope shown in FIG. 3.

The laser scanning fluorescence microscope of the first embodiment comprises, in a main body 11 of the microscope, a laser light source section 1, an exchangeable objective lens 2, a scanner section 3 as a scanning means, a lens unit 4 including a pupil projection lens 6 and an image forming lens 5, and a detection optical system 7.

It is desirable to use a semiconductor laser in the laser light source section 1 since the main body 11 of the microscope can be miniaturized by using it.

The objective lens 2 forms, together with the image forming lens unit 5, an objective optical system 8. The objective optical system 8 has a function of condensing excitation light from the laser light source section 1 on a sample 10 on a stage 9. Moreover, the objective lens 2 is configured so that its back focal position is made conjugate with a position near the scanner section 3 by the image forming lens 5 and a pupil projection lens 6. The image forming lens 5 has a function of forming an intermediate image of the sample 10.

The pupil projection lens 6 is arranged between the scanner section 3 and the objective optical system 8.

A detection optical system 7 has a barrier-filter 7a, a lens 7b, a confocal pinhole 7c, and a light receiving optical sensor 7d, and it is configured so that fluorescence emanating from the sample 10 and transmitted through the objective optical system 8 and the pupil projection lens 6 is detected by the light receiving optical sensor 7d.

The laser light source section 1 has a laser light source 1a and a collimating optical system that is composed of lenses 1b and 1d and a pinhole 1c.

Between the scanner section 3 and the detection optical system 7, a dichroic mirror 16 is arranged for leading fluorescence from the sample 10 to the detection means 7, while leading excitation light from the light source section 1 to the sample.

A laser drive section 14 is connected with the laser light source section 1 for driving emission of laser light from the laser light source 1a.

A focusing mechanism section 12 for focusing the objective lens 2 is arranged on the main body 11 of the microscope.

In addition, the laser scan type fluorescence microscope has an x-y-θ main body moving mechanism 13 for performing positional adjustment of the main body 11 of the microscope, in two dimensions and with respect to an angle θ at which the specimen is observed.

The laser scan type fluorescence microscope is connected with a processing control means 15, such as a personal computer and the like. The processing control means 15 is constructed and arranged to carry out: wavelength control of laser light emanating from the laser light source as driven by the laser drive section 14; wavelength selection of dichroic mirrors, filters, etc.; control of a wavelength-separation element; drive control of the laser drive section 14; analysis and display control of detection information received by the light receiving optical sensor 7d of the detection optical system 7; drive control of the scanner section 3; drive control of the focusing mechanism section 12; drive control of the x-y-θ main body moving mechanism 13; and so on.

In the laser scan type fluorescence microscope of the first embodiment, the excitation light emanating from the laser light source 1a is condensed on the pinhole 1c by the lens 1b, and is converted into a beam of parallel rays by the lens 1d. Then, it is led to the scanner section 3 via the diachronic mirror 16, and the beam of rays is shifted two-dimensionally in reference to the optical axis by each rotation of Galvano mirrors 3a and 3b of the scanner section 3, to be condensed at the intermediate image position as a primary image through the pupil projection lens 6. The excitation light, which is condensed at the intermediate image position, is incident on the sample 10 through the image forming lens 5 and the objective lens 2 in a shape like a minute spot. At this time, the excitation light, with which the surface of the sample 10 is irradiated, is made to scan by the scanner section 3.

The back focal position of the objective lens 2 is projected near the scanner section 3 by the image forming lens 5 and the pupil projection lens 8.

The fluorescence excited on the sample 10 by irradiation with the excitation light is led to the detection optical system 7 via the objective lens 2, the image forming lens 5, the pupil projection lens 6, the scanner section 3, and the dichroic mirror 16. Then, only the fluorescence transmitted through the confocal pinhole 7c via the barrier filter 7a and the lens 7b is detected by the light receiving optical sensor 7d, such as a photo multiplier.

Here, the laser scan type fluorescence microscope of the first embodiment is configured to satisfy the following condition:

$$0.15 \leq D/L \leq 0.5 \quad (1)$$

where D is a parfocal distance of the objective lens 2, and L is a distance from the surface of the sample 10 to the position E conjugate with the back focal position of the objective lens 2 and located near the scanning means (scanner section 3).

When the condition (1) is satisfied as mentioned in the laser scan type fluorescence microscope of the first embodiment, it becomes possible to shorten a distance from the scanning means 3 to the sample 10, and miniaturization of the equipment can be achieved.

If it exceeds the upper limit of the condition (1), the focal lengths of the image forming lens 5 and the pupil projection lens 6 become short, and an interval between the pupil projection lens 6 and the scanning means 3 becomes short too much, and an interference occurs.

On the other hand, if it is less than the lower limit of the condition (1), the full length from the sample 10 to the scanning means 3 becomes long too much, and the miniaturization of the equipment becomes difficult.

Figure 5:
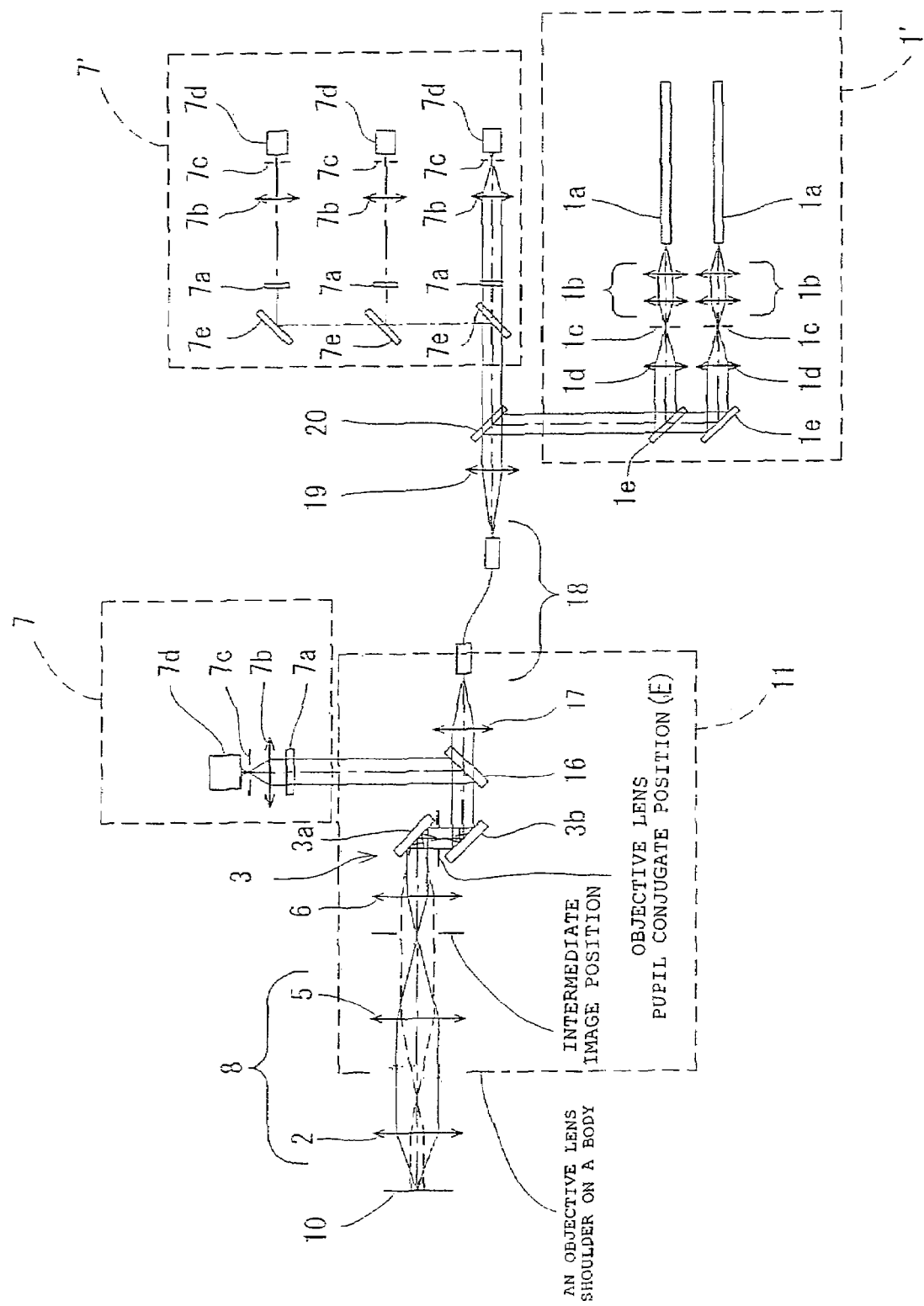
FIG. 5 is a diagram showing a schematic configuration of an optical system in a second embodiment of the laser scan type fluorescence microscope according to the present invention.

FIG. 5 is a diagram showing a schematic configuration of an optical system in the second embodiment of the laser scan type fluorescence microscope according to the present invention. Here, the same symbols are used to show components having the same composition as in the first embodiment.

The laser scan type fluorescence microscope of the second embodiment is a modification of the first embodiment, where a dichroic mirror 20, a lens 19, an optical transmission means 18, a lens 17, and the dichroic mirror 16 are arranged between a light source section 1' and the scanning means 3.

The optical transmission means 18 is composed of an optical fiber, such as a single mode fiber or a multi-mode fiber. Since an end surface of the optical transmission means 18 is conjugate with a specimen surface position and a core diameter of the end surface of the fiber serves as a confocal pinhole, a pinhole 1c of a light source section 1' and a pinhole 7c of a second detector 7' may be removed from an optical path or may have sufficiently large diameters in reference to the diffraction diameter. When the optical transmission means 18 is a multi-mode fiber, its large core diameter in reference to the diffraction diameter weakens the confocal effect, but it makes it possible to pick up a fluorescence image brightly. Therefore, it is preferred to choose a fiber according to the purpose of observation. When performing non-confocal, normal fluorescence observation using a multi-mode fiber for the optical transmission means 18, it is preferred to remove the pinhole 1c of the light source section 1' and the pinhole 7c of the second detector 7' from the optical path.

The dichroic mirror 20 is configured to lead fluorescence from the sample 10 to the second detection optical system 7', while leading the excitation light from the light source section 1' to the sample 10.

And the configuration is made so that, via the optical transmission means 18, the fluorescence from the sample 10 through the lens 17 is led to the second detection means 7', while excitation light from the laser light source section 1' is led to the scanning means 3.

In the embodiment of FIG. 4, as for the light source section 1', a plurality of sets each including a light source 1a to a lens 1d are prepared, and dichroic mirrors 1e are arranged accordingly.

If an optical transmission means is arranged between the laser light source section 1' and the scanning means 3 as shown in the laser scan type fluorescence microscope of the second embodiment, it becomes possible to give a degree of freedom to arrangement of the optical system in the main body of the equipment from the scanner section 3 to the objective lens 2 and the laser light source section 1'. For this reason, the optical system in the main body of the microscope can be miniaturized in a suitable size for observation in a state of a sample being alive (in vivo).

In the second embodiment, if a near-infrared Femto-second pulsed laser is used for the laser light source 1', it is possible to make observation using the microscope as a fluorescence microscope with multiphoton excitation.

In this case, it is preferred to use the detector 7 as a detector for fluorescence generated by multiphoton excitation, to appropriately select the spectrum characteristic of the dichroic mirrors 1e, 16, and 20, and to make pinhole diameters of the pinholes 1c and 7c sufficiently larger than a diffraction diameter or remove the pinholes from the optical path.

Figure 6:
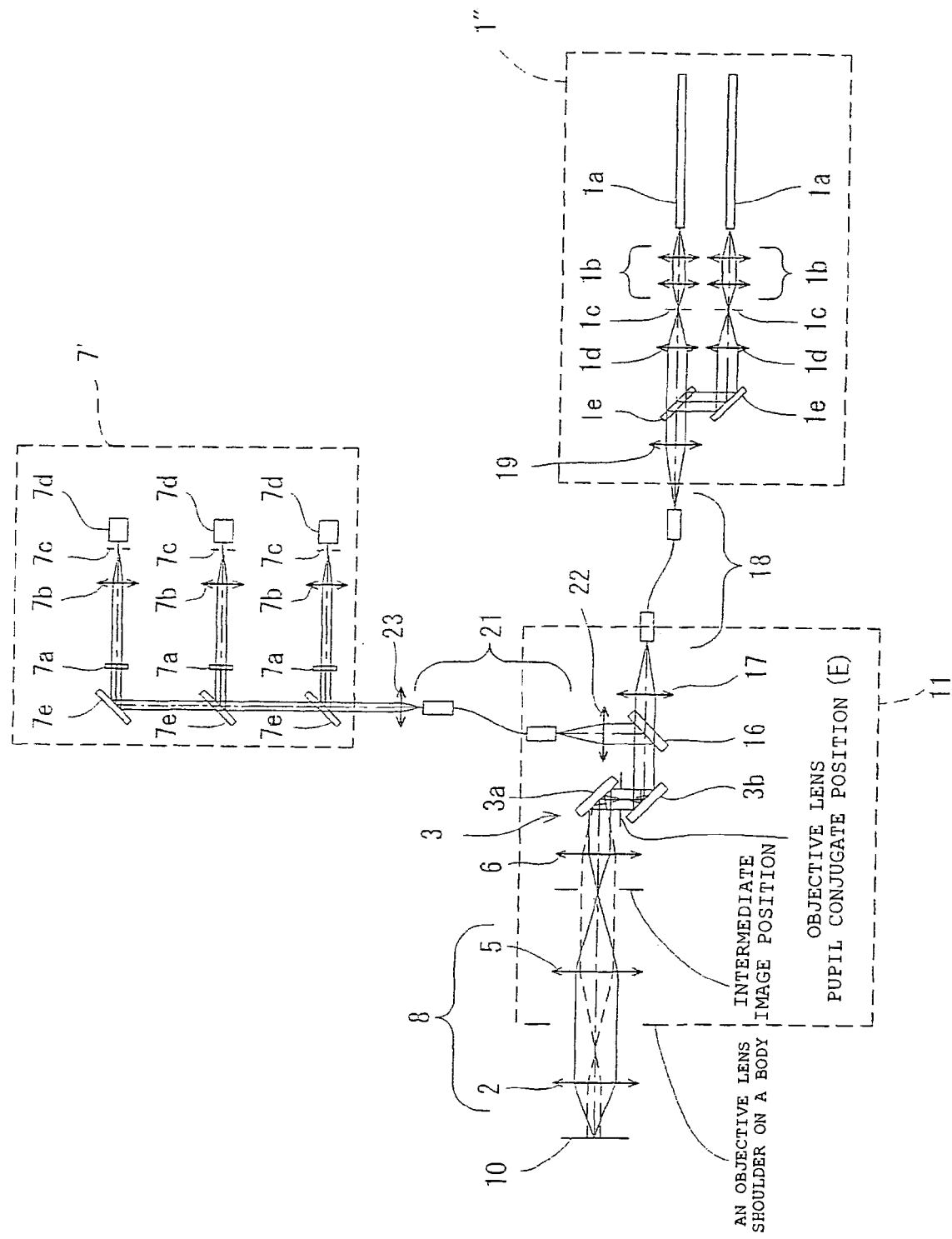
FIG. 6 is a diagram showing a schematic configuration of an optical system in a third embodiment of the laser scan type fluorescence microscope according to the present invention.

FIG. 6 is a diagram showing an outline composition of the optical system in the third embodiment of the laser scan type fluorescence microscope concerning the present invention. Here, the same symbols are used to show components having the same composition as in the second embodiment.

The laser scan type fluorescence microscope of the third embodiment is a modification of the second embodiment, where a lens 22, the optical transmission means 21 which is composed of an optical fiber such as a single mode fiber or a multi-mode fiber, and a lens 23 are arranged between the dichroic mirror 16 and the detection optical system 7'. And the configuration is made so that, while the excitation light from a light source section 1" is led to the sample 10 via the optical transmission means 18, the fluorescence from the sample 10 is led to the second detection optical system 7' via the optical transmission means 21. As in the second embodiment, since end surfaces of optical fibers of the optical transmission means 18 and 21 are conjugate with a specimen surface position and core diameters of the end surfaces of the fibers serve as confocal pinholes, a pinhole 1c of the light source section 1" and the pinhole 7c of the detector 7' may be removed from the optical path or may have sufficiently large diameters in reference to the diffraction diameter. When the optical transmission means 18 and 21 are multi-mode fibers, their large core diameters in reference to the diffraction diameter weaken the confocal effect, but they make it possible to pick up a fluorescence image brightly. Therefore, it is preferred to choose a fiber according to the purpose of observation. When carrying out non-confocal, normal fluorescence observation using multi-mode fibers for the optical transmission means 18 and 21, it is preferred to remove the pinhole 1c of the light source section 1" and the pinhole 7c of the detector 7' from the optical path.

It is desirable to constitute such way as mentioned above, because the optical system in the main body of the microscope equipment can be miniaturized much more.

If an optical fiber constituting the optical transmission means 18, which leads the excitation light from the light source section 1" to the scanner section 3, and an optical fiber constituting the optical transmission means 21, which leads the fluorescence from the sample 10 through the pupil projection lens 6 to the second detection optical system 7', are separately arranged, respectively, the second detection optical system 7' can avoid an influence thereon by auto-fluorescence, which is generated when the excitation light enters the optical fiber 18, and thus can detect the fluorescence generated by the sample 10 with high accuracy.

In the laser scan type fluorescence microscope of the third embodiment, when the optical transmission means 18 and 21 are composed of multi-mode fibers, it is desirable to satisfy the following conditions (7) to (9).

$$2 \leq \Phi em/\Phi ex \leq 12 \qquad (7)$$

$$0.61 \times (\lambda ex/NAex) < \Phi ex \qquad (8)$$

$$0.61 \times (\lambda em/NAem) < \Phi em \qquad (9)$$

where $\Phi ex$ is a core diameter of the multi-mode fiber 18, $\Phi em$ is a core diameter of the multi-mode fiber 21, NAex is a numerical aperture where light is incident on the multi-mode fiber 18 via the lens 19, $\lambda ex$ is an excitation wavelength, NAem is a numerical aperture where light is incident on the multi-mode fiber 21 via the lens 22, and $\lambda em$ is a fluorescence wavelength.

If the conditions (7) to (9) are satisfied, the proportion of the amount of detected fluorescence to the amount of excitation light from the light source becomes high, so that a bright fluorescence image is obtained. In addition, since a predetermined amount of picture information from the sample with respect to thickness direction can be obtained, operation performance is improved in observation in the state where the sample is alive (in vivo).

If it is less than the lower limit of the condition (7), since the proportion of the detected fluorescence to the excitation light from the light source becomes low, the acquired fluorescence image is darkened and the picture information on the thickness direction of the sample extremely decreases. Therefore, the operation performance in observation worsens.

On the other hand, if it exceeds the upper limit of the condition (7), too much picture information covering the thickness direction of the sample is obtained, and a picture other than the fluorescence to be observed becomes too conspicuous. Therefore, it becomes difficult to carry out a fluorescence observation.

If conditions (8) and (9) are not satisfied, the excitation light to the sample becomes weak or the intensity of detected fluorescence becomes low, to extremely decreases the picture information on the thickness direction of the sample. Therefore the operation performance in observation worsens.

It is more desirable if the following condition (7-1) is satisfied.

$$4 \leq \Phi em/\Phi ex \leq 10 \qquad (7-1)$$

The composition of the laser scan type fluorescence microscope which satisfies the conditions (7) to (9) mentioned above of the third embodiment is applicable also to a general laser scan type fluorescence microscope which does not satisfy the condition (1).

Figure 7:
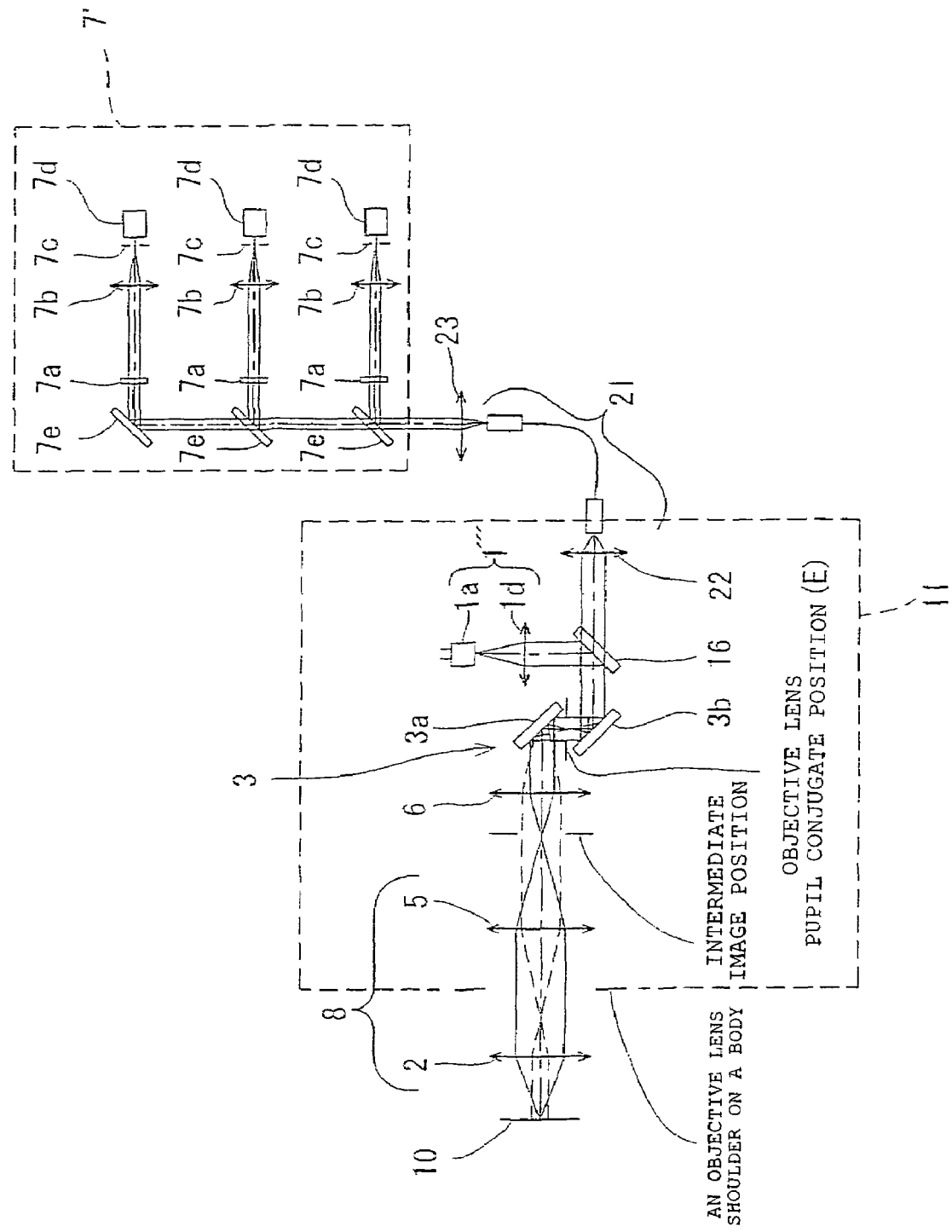
FIG. 7 is a diagram showing a schematic configuration of an optical system in a fourth embodiment of the laser scan type fluorescence microscope according to the present invention.

FIG. 7 is a diagram showing an outline composition of the optical system in the fourth embodiment of the laser scan type fluorescence microscope according to the present invention. Here, the same symbol is used to show a component having the same composition in the first embodiment.

The laser scan type fluorescence microscope of the fourth embodiment is a modification of the first embodiment, where a light source section 1''' is composed of a laser light source 1a and a lens 1d. The lens 22, the optical transmission means 21, the lens 23, and the detection optical system 7" are arranged at an opposite side of a Galvano mirror 3b which is separated from the dichroic mirror 16.

The optical transmission means 21 is composed of an optical fiber, such as a single mode fiber or a multi-mode fiber. An optical fiber end surface of the optical transmission means 21 is conjugate with a specimen surface position, and since a core diameter of the fiber end surface serves as a confocal pinhole, the pinhole 1c''' of the light source section 1 and the pinhole 7c of the detector 7' may be removed from the optical path or may have a larger diameter in reference to the diffraction diameter. If the optical transmission means 21 is a multi-mode fiber, it is possible to pick up fluorescence image brightly, although the confocal effect becomes weaker as a fiber core diameter becomes large in reference to the diffraction diameter. Therefore, it is preferred to choose a fiber according to the purpose of observation.

In the laser scan type fluorescence microscope according to the present invention shown by these embodiments, parallel luminous flux deflected by the scanning means (scanner section 3) is relayed to the intermediate image position through the pupil projection lens 6.

Here, if the pupil projection lens 6 is composed of two or more lenses, wherein a concave surface of the lens arranged nearest to the scanning-means side is directed to the scanning-means side, and a concave surface of the lens nearest to the middle-image side is directed to the middle-image side, correction of an optical performance in the intermediate image can be carried out well.

In the laser scan type fluorescence microscope of the present invention shown by each of embodiments mentioned above, it is desirable to satisfy the following condition (2):

$$0.2 \leq Fe/D3 \leq 0.5 \quad (2)$$

where D3 is a distance from the position conjugate with the pupil of the objective lens 2 and arranged near the scanning means to the intermediate image position of the image forming lens 5, and Fe is a focal length of the pupil projection lens 6.

If condition (2) is satisfied, it is possible to shorten a distance from the scanning means to the intermediate image position, and to miniaturize the equipment, while keeping the optical performance of the pupil projection lens good.

If it exceeds the upper limit of the condition (2), the distance from the scanning means to the pupil projection lens becomes short, and accordingly a space between them becomes so short to cause interference.

On the other hand, if less than the lower limit of the condition (2), it is difficult to miniaturize the equipment since the full length from the scanning means to the intermediate image position becomes too long.

In the laser scan type fluorescence microscope shown by each of the embodiments mentioned above, which comprises two or more lens groups, having at least one cemented lens of a positive lens and a negative lens, it is desirable to satisfy the following conditions (3) and (4):

$$0.4 \leq FTL/D1 \leq 1 \quad (3)$$

$$80 \leq \upsilon p \quad (4)$$

where $\upsilon p$ is Abbe's Number of the positive lens in this cemented lens, FTL is a focal length of the image forming lens 5, and D1 is a distance from the position holding the objective lens unit 2 to the intermediate image position.

If the condition (3) is satisfied, it becomes possible to shorten a distance from the the objective lens shoulder to the intermediate image position, and to miniaturize the equipment. If the condition (4) is satisfied, spherical aberration and axial chromatic aberration generated by a shortened focal length are well compensated for, and confocal fluorescence observation from visible region to near-infrared region can be carried out.

When a confocal fluorescence microscope is constituted in the present invention here, the spherical aberration and the axial chromatic aberration appear not as a picture in the actually obtained picture, but affects wave front aberration in each wavelength and an observation domain. If the condition of wave front aberration of the optical system of the present invention is good, the picture obtained from the detector has high resolution and high S/N. Therefore, by correcting spherical aberration and off-axial aberration in good condition, the wavefront aberration can be corrected good as a result. The same may be applied to each of aberrations described by the following-conditions.

If it exceeds the upper limit of the condition (3), an interval between the objective lens and the image forming lens becomes too short to arrange a focusing mechanism by which the working distance of the objective lens is changed.

On the other hand, if less than the lower limit of the condition (3), it becomes difficult for the full length from the sample to the scanning means to become long too much, and miniaturization of the equipment is difficult.

It is not desirable that it is less than the lower limit of the condition (4), If so, correction of the chromatic aberration at an axis and spherical aberration generated in the objective optical system becomes difficult, and accordingly the confocal fluorescence observation from visible region to near-infrared light of the wavelength of the excitation light, becomes difficult.

In the laser scan type microscope of each of embodiments mentioned above, if the image forming lens unit 5 includes at least two lens groups that are a front group at an intermediate image side and a rear group at an objective lens side, where the front group has at least one negative lens, it is desirable to satisfy the following conditions (5) and (6):

$$0.4 \leq D2/FTL \leq 1 \quad (5)$$

$$0.7 \leq FTL1/FTL \leq 1.5 \quad (6)$$

where FTL1 is a focal length of the rear group of the image forming lens 5, and D2 is an interval between the front group of the image forming lens unit 5 and the rear group of the image forming lens unit 5.

Thus, if the image forming lens unit 5 is composed of two lens groups, correction of the aberration can be carried out by the rear group so that the aberration in the front group may be negated, and a suitable laser scan type fluorescence microscope can be obtained by observation in vivo.

If conditions (5) and (6) are satisfied, it becomes possible to correct astigmatism, coma aberration and magnification chromatic aberration better.

It is not desirable if it exceeds the upper limit of the condition (5), since the lenses in the front group are located so close to the intermediate image position that the image quality is degraded by flaws or dust on a lens surface.

On the other hand, if less than the lower limit of the condition (5), chromatic aberration on the axis and coma aberration off the axis gets worse. Therefore, it is not desirable.

If it exceeds the upper limit of the condition (6), the power of the rear group becomes too weak to carry out correction of color spherical aberration and coma aberration.

On the other hand, if it falls below the lower limit of the condition (6), the power of the rear group becomes too strong to achieve correction of chromatic aberration on the axis and coma aberration.

Hereafter, embodiments of the pupil projection lens and an objective lens optical system (an image forming lens and an objective lens) of the laser scan type microscope according to the present invention will be explained. Here, the optical system of each embodiment is applied to the laser scan type fluorescence microscope of each of embodiments shown in FIGS. 2 to 7. In explanation of each embodiment, the direction of the optical system is shown in reversed direction to the direction shown in FIGS. 2 to 7 for convenience sake of explanation.

FIRST EMBODIMENT

Figure 8:
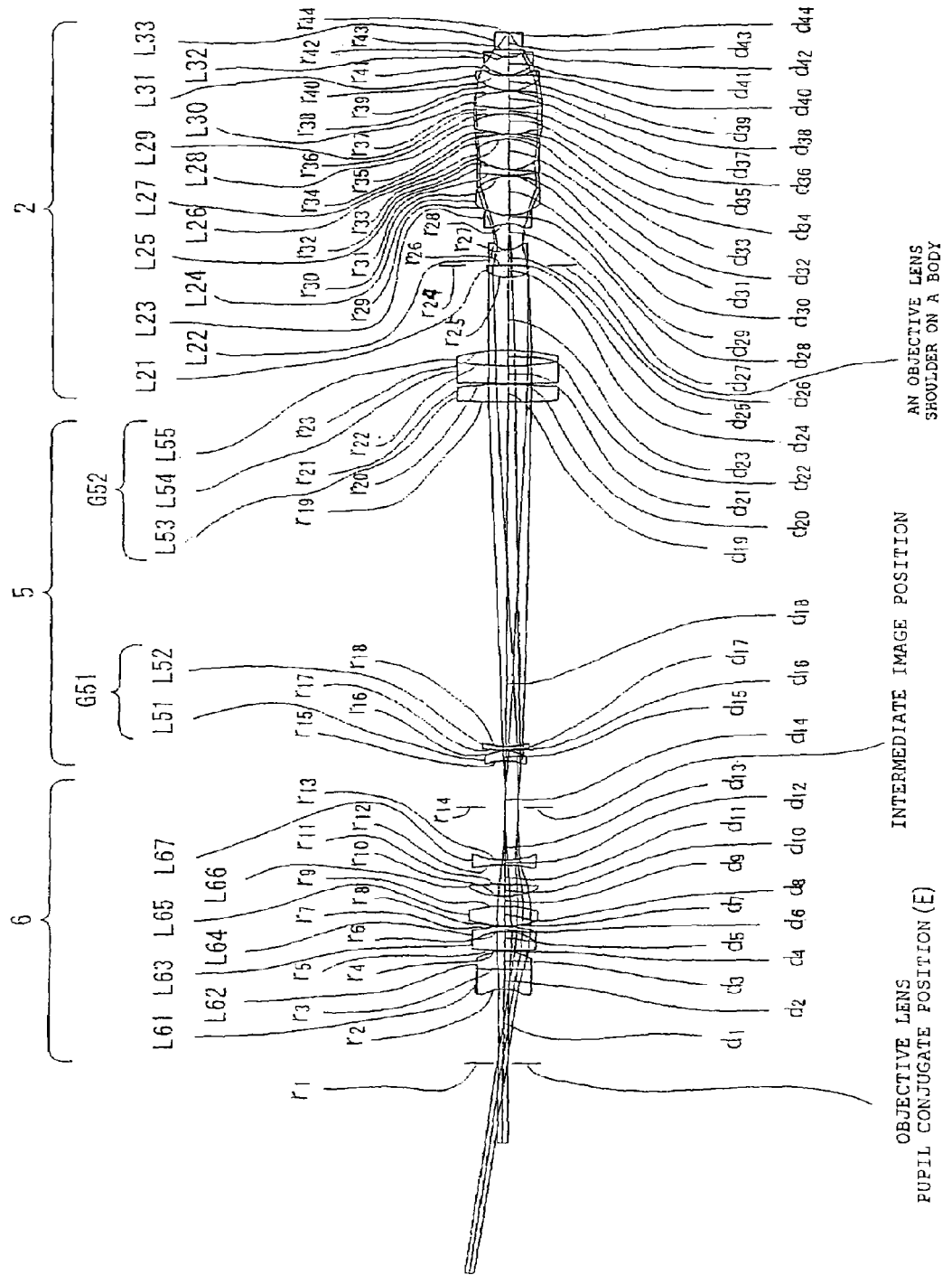
FIG. 8 is a sectional view taken along the optical axis for showing an optical arrangement of a pupil projection optical system and an objective optical system of a first embodiment, used in the laser scan type fluorescence microscope of the present invention.

FIG. 8 is a sectional view showing a constitution of a pupil projection optical system and an objective lens optical system developed along the optical axis in a laser scan type fluorescence microscope concerning the first embodiment according to the present invention.

In the laser scan type fluorescence microscope of the first embodiment a pupil projection optical system 6 comprises, in order from a scanning-means side (left-hand side of this page), a positive cemented lens with weak power consisting of a planoconcave lens L61, a concave surface of which is directed to the scanning-means side and a planoconvex lens L62, a convex surface of which is directed to a middle-image side, a positive cemented lens consisting of a double convex lens L63, and a negative meniscus lens L64, a concave surface of which is directed to the scanning-means side, a double convex lens L65, a double convex lens L66, and a double concave lens L67.

An image forming lens unit 5 comprises, in order from the intermediate image side, a front group G51 and a rear group G52.

The front group G51 comprises, in order from the middle-image side, a positive meniscus lens L51 a concave surface of which is directed to the middle-image side, and a negative meniscus lens L52, a convex surface of which is directed to the middle-image side.

The rear group G52 comprises, in order from the middle-image side, a double convex lens L53, a positive cemented lens having a planoconcave lens L54, a concave surface of which is directed to the side of a sample 10, and a double convex lens L55.

An objective lens system comprises, in order from the intermediate image side, a negative cemented meniscus lens having a double convex lens L21 and a double concave lens L22, a positive cemented meniscus lens having a double concave lens L23 and a double convex lens L24, a negative cemented lens having a negative meniscus lens L25, a double convex lens L26 and a negative meniscus lens L27, a positive cemented lens having a double convex lens L28, a double concave lens L29 and a double convex lens L30, a positive meniscus lens L31, and a positive cemented lens having a positive meniscus lens L32 and a positive meniscus lens L33.

The objective lens mentioned above is a submerged type objective lens, where the aperture size is 0.8, the working distances is 3.3 mm, and the focal length is 45 mm.

The objective lens unit 2 is constituted so as to be replaceable to the laser scan type fluorescence microscope of the present invention, and an observation range can be changed by changing magnification of the objective lens.

Furthermore, as the objective lens unit 2 is a submerged type objective lens, it is suitable to obtain a bright fluorescence image in a state where the sample is alive, by combining it with the laser scan type fluorescence microscope of the present invention under a state in vivo, For example, when a nerve cell of the brain of a mouse etc. is observed, a hole for observing a cerebral nerve cell is made in a mouse head, and the head on which the hole is made is closed by an optical components, such as glass of a plane-parallel plate, and then observation is carried out through the hole of the head by combining a submerged type objective lens and the laser scan type fluorescence microscope according to the present invention. By such observation mentioned above, the fluorescence picture from a cerebral nerve cell can be obtained. Moreover, since the hole of the mouse head for observation is closed by optical components, such as glass, an observation in the state where the mouse is alive. Thus, it is effective in various applications, such as observation of growth of a cancer cell etc., and a functional elucidation of a cell.

By changing the magnification and use of the objective lens by a specimen, it can be used not only for observation In vivo but also various uses as a laser scan type fluorescence microscope miniaturized.

Next, the numerical data of optical components which constitutes the optical system of the first embodiment are shown. In the numerical data of the first embodiment, $r_1$, $r_2$, ... denote radii of curvature of individual lens surfaces; $d_1$, $d_2$, ... denote thickness of individual lenses or air space between them; $n_{d1}$, $n_{d2}$, ... denote refractive indices of individual lenses at the d line; and $v_{d1}$, $v_{d2}$, ... denote Abbe's numbers of individual lenses. The first surface is at a pupil conjugate position of an objective lens, into which luminous flux from an object point at the infinite distance enters. The objective lens is a submerged type objective lens and the aperture size is 0.8, the free working distance is 3.3 mm, and the focal length is 45 mm.

These symbols are commonly used in the examples to be described later.

| Numerical data 1 | | | |
|---|---|---|---|
| $r_1 = \infty$ | $d_1 = 14.3728$ | | |
| $r_2 = -6.588$ | $d_2 = 3.9$ | $n_{d2} = 1.48749$ | $v_{d2} = 70.23$ |
| $r_3 = \infty$ | $d_3 = 3.48$ | $n_{d3} = 1.497$ | $v_{d3} = 81.54$ |
| $r_4 = -9.162$ | $d_4 = 0.2$ | | |
| $r_5 = 125.679$ | $d_5 = 3.52$ | $n_{d5} = 1.43875$ | $v_{d5} = 94.93$ |
| $r_6 = -8.85$ | $d_6 = 1$ | $n_{d6} = 1.7725$ | $v_{d6} = 49.6$ |
| $r_7 = -20.953$ | $d_7 = 0.2$ | | |
| $r_8 = 21.356$ | $d_8 = 3.62$ | $n_{d8} = 1.43875$ | $v_{d8} = 94.93$ |
| $r_9 = -21.356$ | $d_9 = 1.91$ | | |
| $r_{10} = 13.127$ | $d_{10} = 2.39$ | $n_{d10} = 1.497$ | $v_{d10} = 94.93$ |
| $r_{11} = -282.633$ | $d_{11} = 3.8$ | | |
| $r_{12} = -27.852$ | $d_{12} = 1$ | $n_{d12} = 1.755$ | $v_{d12} = 52.32$ |
| $r_{13} = 12.42$ | $d_{13} = 10.1024$ | | |
| $r_{14} = \infty$ (intermediate image) | | | |
| | $d_{14} = 9$ | | |
| $r_{15} = -11.68$ | $d_{15} = 1.85$ | $n_{d15} = 1.497$ | $v_{d15} = 81.54$ |
| $r_{16} = -7.6$ | $d_{16} = 0.25$ | | |
| $r_{17} = 24.968$ | $d_{17} = 0.78$ | $n_{d17} = 1.51742$ | $v_{d17} = 52.43$ |
| $r_{18} = 13.675$ | $d_{18} = 67.5334$ | | |
| $r_{19} = 186.465$ | $d_{19} = 3.5$ | $n_{d19} = 1.43875$ | $v_{d19} = 94.93$ |
| $r_{20} = -126.462$ | $d_{20} = 0.25$ | | |
| $r_{21} = \infty$ | $d_{21} = 3.5$ | $n_{d21} = 1.741$ | $v_{d21} = 52.64$ |
| $r_{22} = 52.265$ | $d_{22} = 2.98$ | $n_{d22} = 1.43875$ | $v_{d22} = 94.93$ |
| $r_{23} = -37.182$ | $d_{23} = 16.23$ | | |
| $r_{24} = \infty$ (lens shoulder) | | | |
| | $d_{24} = -2.2345$ | | |
| $r_{25} = 7.1701$ | $d_{25} = 2.2311$ | $n_{d25} = 1.51884$ | $v_{d25} = 40.75$ |
| $r_{26} = -40.9891$ | $d_{26} = 2.8243$ | $n_{d26} = 1.50378$ | $v_{d26} = 66.81$ |
| $r_{27} = 3.3957$ | $d_{27} = 4.9475$ | | |
| $r_{28} = -6.0168$ | $d_{28} = 1.7182$ | $n_{d28} = 1.52944$ | $v_{d28} = 51.72$ |
| $r_{29} = 9.3327$ | $d_{29} = 7.3934$ | $n_{d29} = 1.497$ | $v_{d29} = 81.54$ |
| $r_{30} = -7.1338$ | $d_{30} = 0.2$ | | |
| $r_{31} = 40.7756$ | $d_{31} = 1.1467$ | $n_{d31} = 1.755$ | $v_{d31} = 52.32$ |
| $r_{32} = 8.0004$ | $d_{32} = 5.7699$ | $n_{d32} = 1.43875$ | $v_{d32} = 94.93$ |
| $r_{33} = -9.8515$ | $d_{33} = 1$ | $n_{d33} = 1.59551$ | $v_{d33} = 39.26$ |
| $r_{34} = -18.0562$ | $d_{34} = 0.2$ | | |
| $r_{35} = 18.8453$ | $d_{35} = 3.783$ | $n_{d35} = 1.43875$ | $v_{d35} = 94.93$ |
| $r_{36} = -13.4657$ | $d_{36} = 1.3$ | $n_{d36} = 1.7725$ | $v_{d36} = 49.6$ |
| $r_{37} = 38.9003$ | $d_{37} = 3.2938$ | $n_{d37} = 1.497$ | $v_{d37} = 81.54$ |
| $r_{38} = -12.2456$ | $d_{38} = 0.2$ | | |
| $r_{39} = 8.6474$ | $d_{39} = 2.9067$ | $n_{d39} = 1.56907$ | $v_{d39} = 71.3$ |
| $r_{40} = 15.3871$ | $d_{40} = 0.2$ | | |
| $r_{41} = 6.2872$ | $d_{41} = 3.3861$ | $n_{d41} = 1.7725$ | $v_{d41} = 49.6$ |
| $r_{42} = 5.4004$ | $d_{42} = 1.4337$ | $n_{d42} = 1.51633$ | $v_{d42} = 64.14$ |
| $r_{43} = 80$ | $d_{43} = 3.3$ | $n_{d43} = 1.33304$ | $v_{d43} = 55.79$ |
| $r_{44} = \infty$ | $d_{44} = 0$ | $n_{d44} = 1.33304$ | $v_{d44} = 55.79$ |

$D = d_{24} + d_{25} + \ldots + d_{44} (r_{24} \text{ to } r_{44})$ $D1 = d_{14} + d_{15} + \ldots + d_{23} (r_{14} \text{ to } r_{24})$ $D2 = d_{18} (r_{18} \text{ to } r_{19})$ $D3 = d_1 + d_2 + \ldots + d_{13} (r_1 \text{ to } r_{14})$

SECOND EMBODIMENT

Figure 9:
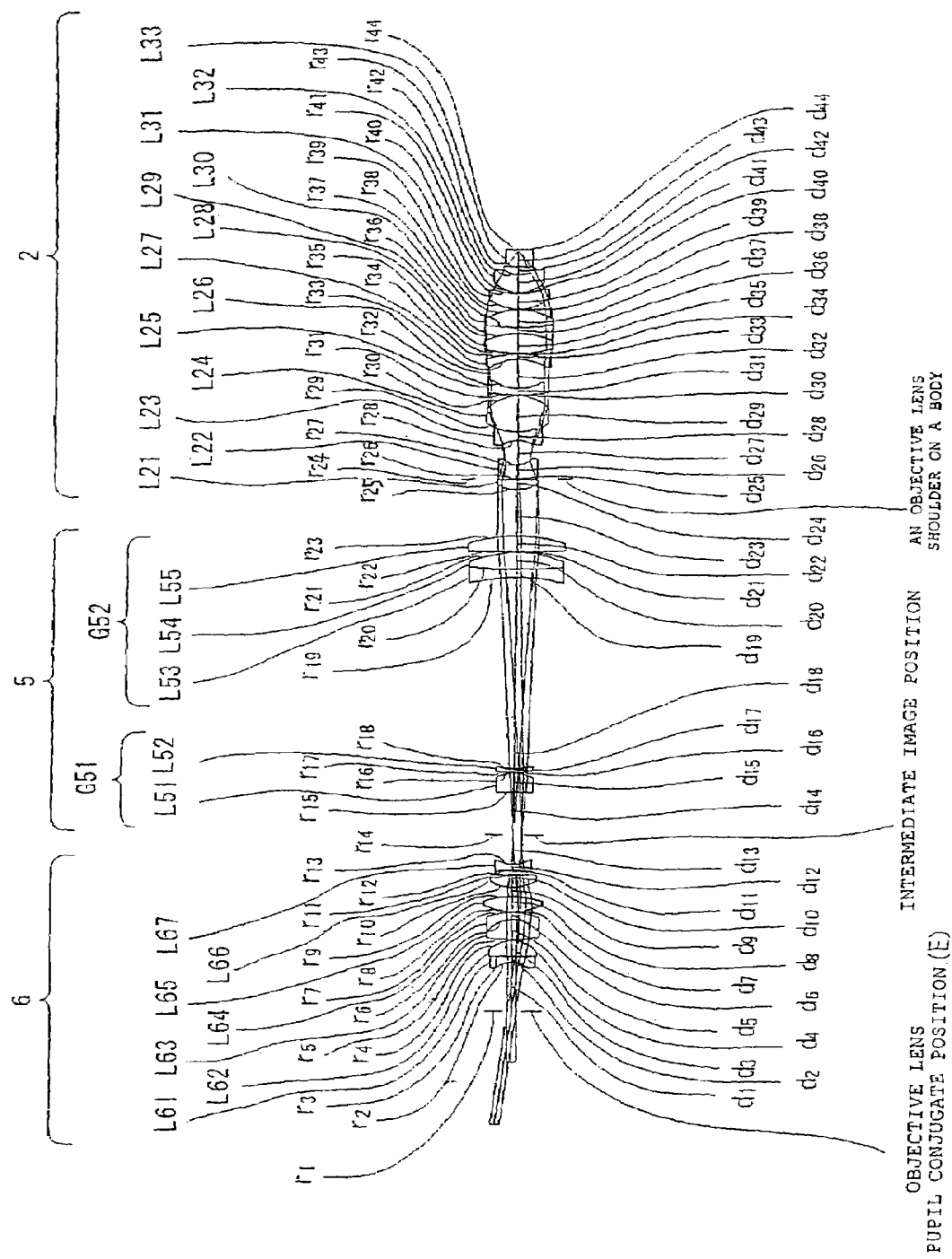
FIG. 9 is a sectional view taken along the optical axis for showing an optical arrangement of a pupil projection optical system and an objective optical system of a second embodiment, used in the laser scan type fluorescence microscope of the present invention.

FIG. 9 is a sectional view showing a constitution of a pupil projection optical system and an objective lens optical system along the optical axis in a laser scan type fluorescence microscope concerning the second embodiment according to the present invention.

In the laser scan type fluorescence microscope of the second embodiment, a pupil projection optical system 6 comprises, in order from a scanning-means side (left-hand side of this page), a positive cemented lens with weak power consisting of a planoconcave lens L61, a concave surface of which is directed to the scanning-means side and a planoconvex lens L62, a convex surface of which is directed to a middle-image side, a positive cemented lens consisting of a double convex lens L63, and a negative meniscus lens L64, a concave surface of which is direcyed to the scanning-means side, a double convex lens L65, a double convex lens L66, and a double concave lens L67.

An image forming lens unit 5 comprises, in order from the intermediate image side, a front group G51 and a rear group G52.

The front group G51 comprises, in order from the middle-image side, a positive meniscus lens L51 a concave surface of which is directed to the middle-image side, and a negative meniscus lens L52, a convex surface of which is directed to the middle-image side.

The rear group G52 comprises, in order from the middle-image side, a positive cemented meniscus lens having a double concave lens L53 and a double convex lens L54, and a double convex lens L55.

An objective lens system 2 comprises, in order from the middle-image side like the first embodiment, a negative cemented meniscus lens having a double convex lens L21 and a double concave lens L22, a positive cemented meniscus lens having a double concave lens L23 and a double convex lens L24, a negative cemented lens having a negative meniscus lens L25, a double convex lens L26 and a negative meniscus lens L27, a positive cemented lens having a double convex lens L28, a double concave lens L29 and a double convex lens L30, and a positive meniscus lens L31, and a positive cemented lens having a positive meniscus lens L32 and a positive meniscus lens L33 The objective lens is a submerged type objective lens and the aperture size is 0.8, the free working distance is 3.3 mm, and the focal length is 45 mm.

Next, the numerical data of optical components which constitutes the optical system of the second embodiment will be shown.

| Numerical data 2 | | | |
|---|---|---|---|
| $r_1 = \infty$ | $d_1 = 9.7843$ | | |
| $r_2 = -4.624$ | $d_2 = 1$ | $n_{d2} = 1.48749$ | $\nu_{d2} = 70.23$ |
| $r_3 = \infty$ | $d_3 = 3.04$ | $n_{d3} = 1.497$ | $\nu_{d3} = 81.54$ |
| $r_4 = -6.051$ | $d_4 = 0.2$ | | |
| $r_5 = 38.988$ | $d_5 = 3.8$ | $n_{d5} = 1.43875$ | $\nu_{d5} = 94.93$ |
| $r_6 = -6.186$ | $d_6 = 1.2$ | $n_{d6} = 1.7725$ | $\nu_{d6} = 49.6$ |
| $r_7 = -13.818$ | $d_7 = 0.2$ | | |
| $r_8 = 12.667$ | $d_8 = 3.19$ | $n_{d8} = 1.43875$ | $\nu_{d8} = 94.93$ |
| $r_9 = -15.719$ | $d_9 = 1.75$ | | |
| $r_{10} = 8.402$ | $d_{10} = 2.44$ | $n_{d10} = 1.497$ | $\nu_{d10} = 81.54$ |
| $r_{11} = -79.63$ | $d_{11} = 0.98$ | | |
| $r_{12} = -19.748$ | $d_{12} = 1.1$ | $n_{d12} = 1.741$ | $\nu_{d12} = 52.64$ |
| $r_{13} = 6.843$ | $d_{13} = 5.8022$ | | |
| $r_{14} = \infty$ (intermediate image) | | | |
| | $d_{14} = 8.4919$ | | |
| $r_{15} = -22.689$ | $d_{15} = 3.82$ | $n_{d15} = 1.48749$ | $\nu_{d15} = 70.23$ |
| $r_{16} = -9.23$ | $d_{16} = 0.15$ | | |
| $r_{17} = 20.762$ | $d_{17} = 0.8$ | $n_{d17} = 1.51742$ | $\nu_{d17} = 52.43$ |
| $r_{18} = 11.803$ | $d_{18} = 37.613$ | | |
| $r_{19} = -30.848$ | $d_{19} = 1.8$ | $n_{d19} = 1.7725$ | $\nu_{d19} = 49.6$ |
| $r_{20} = 188.334$ | $d_{20} = 3.11$ | $n_{d20} = 1.43875$ | $\nu_{d20} = 94.93$ |
| $r_{21} = -21.518$ | $d_{21} = 0.25$ | | |
| $r_{22} = 852.75$ | $d_{22} = 3.05$ | $n_{d22} = 1.497$ | $\nu_{d22} = 81.54$ |
| $r_{23} = -26.986$ | $d_{23} = 11.122$ | | |
| $r_{24} = \infty$ (lens shoulder) | | | |
| | $d_{24} = -2.2345$ | | |
| $r_{25} = 7.1701$ | $d_{25} = 2.2311$ | $n_{d25} = 1.51884$ | $\nu_{d25} = 40.75$ |
| $r_{26} = -40.9891$ | $d_{26} = 2.8243$ | $n_{d26} = 1.50378$ | $\nu_{d26} = 66.81$ |
| $r_{27} = 3.3957$ | $d_{27} = 4.9475$ | | |
| $r_{28} = -6.0168$ | $d_{28} = 1.7182$ | $n_{d28} = 1.52944$ | $\nu_{d28} = 51.72$ |
| $r_{29} = 9.3327$ | $d_{29} = 7.3934$ | $n_{d29} = 1.497$ | $\nu_{d29} = 81.54$ |
| $r_{30} = -7.1338$ | $d_{30} = 0.2$ | | |
| $r_{31} = 40.7756$ | $d_{31} = 1.1467$ | $n_{d31} = 1.755$ | $\nu_{d31} = 52.32$ |
| $r_{32} = 8.0004$ | $d_{32} = 5.7699$ | $n_{d32} = 1.43875$ | $\nu_{d32} = 94.93$ |
| $r_{33} = -9.8515$ | $d_{33} = 1$ | $n_{d33} = 1.59551$ | $\nu_{d33} = 39.26$ |
| $r_{34} = -18.0562$ | $d_{34} = 0.2$ | | |
| $r_{35} = 18.8453$ | $d_{35} = 3.783$ | $n_{d35} = 1.43875$ | $\nu_{d35} = 94.93$ |
| $r_{36} = -13.4657$ | $d_{36} = 1.3$ | $n_{d36} = 1.7725$ | $\nu_{d36} = 49.6$ |
| $r_{37} = 38.9003$ | $d_{37} = 3.2938$ | $n_{d37} = 1.497$ | $\nu_{d37} = 81.54$ |
| $r_{38} = -12.2456$ | $d_{38} = 0.2$ | | |
| $r_{39} = 8.6474$ | $d_{39} = 2.9067$ | $n_{d39} = 1.56907$ | $\nu_{d39} = 71.3$ |
| $r_{40} = 15.3871$ | $d_{40} = 0.2$ | | |
| $r_{41} = 6.2872$ | $d_{41} = 3.3861$ | $n_{d41} = 1.7725$ | $\nu_{d41} = 49.6$ |
| $r_{42} = 5.4004$ | $d_{42} = 1.4337$ | $n_{d42} = 1.51633$ | $\nu_{d42} = 64.14$ |
| $r_{43} = 80$ | $d_{43} = 3.3$ | $n_{d43} = 1.33304$ | $\nu_{d43} = 55.79$ |
| $r_{44} = \infty$ | $d_{44} = 0$ | $n_{d44} = 1.33304$ | $\nu_{d44} = 55.79$ |

$$D = d_{24} + d_{25} + \ldots + d_{44} (r_{24} \text{ to } r_{44})$$

$$D1 = d_{14} d_{15} + \ldots + d_{23} (r_{14} \text{ to } r_{24})$$

$$D2 = d_{18} (r_{18} \text{ to } r_{19})$$

$$D3 = d_1 + d_2 + \ldots + d_{13} (r_1 \text{ to } r_{14})$$

THIRD EMBODIMENT

Figure 10:
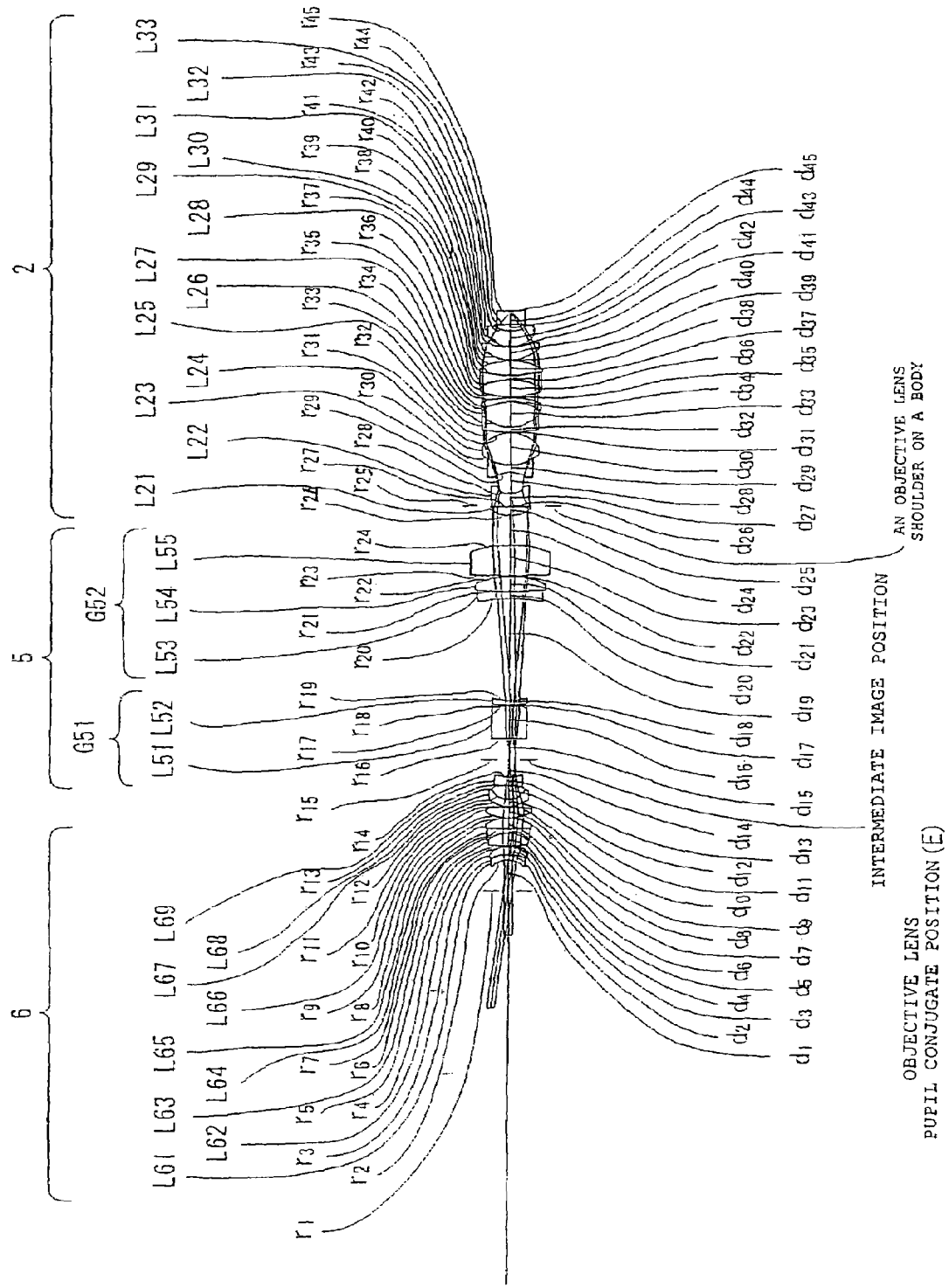
FIG. 10 is a sectional view taken along the optical axis for showing an optical arrangement of a pupil projection optical system and an objective optical system of a third embodiment, used in the laser scan type fluorescence microscope of the present invention.

FIG. 10 is a sectional view showing a constitution of a pupil projection optical system and an objective lens optical system developed along the optical axis in a laser scan type fluorescence microscope concerning the third embodiment according to the present invention.

In the laser scan type fluorescence microscope of the third embodiment, a pupil projection optical system 6 comprises, in order from a scanning-means side (left-hand side of this page), a positive cemented lens of the weak power having a negative-meniscus-lens L61', a concave surface of which is directed to the scanning-means side and a positive-meniscus-lens L62', a concave surface of which is directed to the scanning-means side, a positive cemented lens having a double convex lens L63, a double concave lens L64 and a double convex lens L60, a double convex lens L66, and a cemented negative lens consisting of a negative-meniscus-lens L67'a convex surface of which is directed to the scanning-means side, a double convex lens L68, and a double concave lens L69.

An image forming lens unit 5 comprises, in order from the intermediate image side, a front group G51 and a rear group G52.

The front group G51 comprises, in order from the middle-image side, a positive meniscus lens L51 a concave surface of which is directed to the middle-image side, and a negative meniscus lens L52, a convex surface of which is directed to the middle-image side.

The rear group G52 comprises, in order from the middle-image side, a positive cemented meniscus lens having a double concave lens L53' and a double convex lens L54', and a double convex lens L55.

An objective lens system comprises, like the first embodiment, in order from the intermediate image side, a negative cemented meniscus lens having a double convex lens L21 and a double concave lens L22, a positive cemented meniscus lens having a double concave lens L23 and a double convex lens L24, a negative cemented lens having a negative meniscus lens L25, a double convex lens L26 and a negative meniscus lens L27, a positive cemented lens having a double convex lens L28, a double concave lens L29 and a double convex lens L30, and a positive meniscus lens L31, and a positive cemented lens consisting of a positive meniscus lens L32 and a positive meniscus lens L33. The objective lens is a submerged type objective lens and the aperture size is 0.8, the free working distance is 3.3 mm, and the focal length is 45 mm.

Next, the numerical data of optical components which constitutes the optical system of the third embodiment will be shown.

Numerical data 3

| | | | |
|---|---|---|---|
| $r_1 = \infty$ | $d_1 = 7.4167$ | | |
| $r_2 = -4.0824$ | $d_2 = 1.0919$ | $n_{d2} = 1.603$ | $\nu_{d2} = 65.44$ |
| $r_3 = -8.3801$ | $d_3 = 1.7878$ | $n_{d3} = 1.7725$ | $\nu_{d3} = 49.6$ |
| $r_4 = -5.7535$ | $d_4 = 0.2$ | | |
| $r_5 = 25.6339$ | $d_5 = 2.8925$ | $n_{d5} = 1.43875$ | $\nu_{d5} = 94.93$ |
| $r_6 = -6.4112$ | $d_6 = 1$ | $n_{d6} = 1.7725$ | $\nu_{d6} = 49.6$ |
| $r_7 = 137.8602$ | $d_7 = 2.3153$ | $n_{d7} = 1.497$ | $\nu_{d7} = 81.54$ |
| $r_8 = -9.4621$ | $d_8 = 0.2$ | | |
| $r_9 = 10.6954$ | $d_9 = 2.4857$ | $n_{d9} = 1.497$ | $\nu_{d9} = 81.54$ |
| $r_{10} = -26.6514$ | $d_{10} = 0.15$ | | |
| $r_{11} = 6.9368$ | $d_{11} = 1.5367$ | $n_{d11} = 1.7725$ | $\nu_{d11} = 49.6$ |
| $r_{12} = 3.8697$ | $d_{12} = 3.2119$ | $n_{d12} = 1.497$ | $\nu_{d12} = 81.54$ |
| $r_{13} = -11.1848$ | $d_{13} = 1.8514$ | $n_{d13} = 1.755$ | $\nu_{d13} = 52.32$ |
| $r_{14} = 6.5045$ | $d_{14} = 3.935$ | | |
| $r_{15} = \infty$ | $d_{15} = 5$ | | |
| $r_{16} = -63.258$ | $d_{16} = 7.6$ | $n_{d16} = 1.603$ | $\nu_{d16} = 65.44$ |
| $r_{17} = -14.383$ | $d_{17} = 0.15$ | | |
| $r_{18} = 21.994$ | $d_{18} = 1.2$ | $n_{d18} = 1.51742$ | $\nu_{d18} = 52.43$ |
| $r_{19} = 13.279$ | $d_{19} = 23.5638$ | | |
| $r_{20} = -26.882$ | $d_{20} = 1.6$ | $n_{d20} = 1.788$ | $\nu_{d20} = 47.37$ |
| $r_{21} = 75.482$ | $d_{21} = 3.42$ | $n_{d21} = 1.43875$ | $\nu_{d21} = 94.93$ |
| $r_{22} = -18.536$ | $d_{22} = 0.15$ | | |
| $r_{23} = 141.209$ | $d_{23} = 7$ | $n_{d23} = 1.497$ | $\nu_{d23} = 81.54$ |
| $r_{24} = -22.954$ | $d_{24} = 9$ | | |
| $r_{25} = \infty$ (lens shoulder) | | | |
| | $d_{25} = -2.2345$ | | |
| $r_{26} = 7.1701$ | $d_{26} = 2.2311$ | $n_{d26} = 1.51884$ | $\nu_{d26} = 40.75$ |
| $r_{27} = -40.9891$ | $d_{27} = 2.8243$ | $n_{d27} = 1.50378$ | $\nu_{d27} = 66.81$ |
| $r_{28} = 3.3957$ | $d_{28} = 4.9475$ | | |
| $r_{29} = -6.0168$ | $d_{29} = 1.7182$ | $n_{d29} = 1.52944$ | $\nu_{d29} = 51.72$ |
| $r_{30} = 9.3327$ | $d_{30} = 7.3934$ | $n_{d30} = 1.497$ | $\nu_{d30} = 81.54$ |
| $r_{31} = -7.1338$ | $d_{31} = 0.2$ | | |
| $r_{32} = 40.7756$ | $d_{32} = 1.1467$ | $n_{d32} = 1.755$ | $\nu_{d32} = 52.32$ |
| $r_{33} = 8.0004$ | $d_{33} = 5.7699$ | $n_{d33} = 1.43875$ | $\nu_{d33} = 94.93$ |
| $r_{34} = -9.8515$ | $d_{34} = 1$ | $n_{d34} = 1.59551$ | $\nu_{d34} = 39.26$ |
| $r_{35} = -18.0562$ | $d_{35} = 0.2$ | | |
| $r_{36} = 18.8453$ | $d_{36} = 3.783$ | $n_{d36} = 1.43875$ | $\nu_{d36} = 94.93$ |
| $r_{37} = -13.4657$ | $d_{37} = 1.3$ | $n_{d37} = 1.7725$ | $\nu_{d37} = 49.6$ |
| $r_{38} = 38.9003$ | $d_{38} = 3.2938$ | $n_{d38} = 1.497$ | $\nu_{d38} = 81.54$ |
| $r_{39} = -12.2456$ | $d_{39} = 0.2$ | | |
| $r_{40} = 8.6474$ | $d_{40} = 2.9067$ | $n_{d40} = 1.56907$ | $\nu_{d40} = 71.3$ |
| $r_{41} = 15.3871$ | $d_{41} = 0.2$ | | |
| $r_{42} = 6.2872$ | $d_{42} = 3.3861$ | $n_{d42} = 1.7725$ | $\nu_{d42} = 49.6$ |
| $r_{43} = 5.4004$ | $d_{43} = 1.4337$ | $n_{d43} = 1.51633$ | $\nu_{d43} = 64.14$ |

-continued

Numerical data 3

| | | | |
|---|---|---|---|
| $r_{44} = 80$ | $d_{44} = 3.3$ | $n_{d44} = 1.33304$ | $\nu_{d44} = 55.79$ |
| $r_{45} = \infty$ | $d_{45} = 0$ | $n_{d45} = 1.33304$ | $\nu_{d45} = 55.79$ |

$$D = d_{25} + d_{26} + \ldots + d_{45} (r_{25} \text{ to } r_{45})$$

$$D1 = d_{15} + d_{16} + \ldots + d_{24} (r_{15} \text{ to } r_{25})$$

$$D2 = d_{19} (r_{19} \text{ to } r_{20})$$

$$D3 = d_1 + d_2 + \ldots + d_{14} (r_1 \text{ to } r_{15})$$

Next, numerical parameters used for the condition of the laser scan type microscope of each of embodiments mentioned above are shown in Table 1. Wavefront aberration in each wavelength in each embodiment is shown in Table 2. In the submerged type objective lens system, the aperture size of the objective lens is 0.8, and the focal length is 45 mm, and as for the observation range, the image height is 0.15 at the specimen side. Numerical parameters are shown in Table 3 in case that the laser scanning microscope of each embodiment is constituted as a laser scan type microscope using a multi-mode fiber for the optical transmission means 18 and 21 in the third embodiment showing in FIG. 6. Since difference between wavelengths of excitation light and fluorescence is small, wavelengths of the excitation light and of the fluorescence are treated as the same in Table 3, for convenience.

TABLE 1

| | First embodiment | Second embodiment | Third embodiment |
|---|---|---|---|
| Focal length of a pupil projection lens: Fe | 18.01 | 12 | 9.36 |
| Focal length of an image forming lens: FTL | 75 | 50 | 38.99 |
| Distance from a pupil to a sample: L | 200.37 | 149.96 | 133.76 |
| Focal length of an objective lens: D | 45 | 45 | 45 |
| Distance between an objective lens front group and a rear group: D2 | 67.53 | 37.61 | 23.56 |
| Full length of a pupil projection lens: D3 | 49.5 | 34.99 | 30.08 |
| Distance from an objective lens shoulder to an intermediate image: D1 | 105.87 | 70.20 | 58.68 |
| Focal length of an image forming lens front group: FTL1 | 85.44 | 62.51 | 48.91 |
| Condition (1): D/L | 0.22 | 0.30 | 0.34 |
| Condition (2): Fe/D3 | 0.36 | 0.35 | 0.31 |
| Condition (3): FTL/D1 | 0.71 | 0.71 | 0.66 |
| Condition (4): $\nu_p$ | 95.00 | 95.00 | 95.00 |
| Condition (5): D2/FTL | 0.90 | 0.75 | 0.60 |
| Condition (6): FTL1/FTL | 1.14 | 1.25 | 1.25 |

TABLE 2

| Wavefront aberration λ at each wavelength (nm) | | 435.8 nm | 486.13 nm | 546.07 nm | 587.56 nm | 656.27 nm | 800 nm | 1000 nm |
|---|---|---|---|---|---|---|---|---|
| Embodiment 1 | IH = 0 | 0.0257 | 0.0168 | 0.0068 | 0.0019 | 0.0065 | 0.015 | 0.0206 |
| | IH = 0.075 | 0.0525 | 0.033 | 0.0131 | 0.0148 | 0.0147 | 0.0203 | 0.0248 |
| | IH = 0.15 | 0.0796 | 0.0858 | 0.0655 | 0.055 | 0.0311 | 0.009 | 0.0036 |
| Embodiment 2 | IH = 0 | 0.0258 | 0.0164 | 0.0061 | 0.0033 | 0.0096 | 0.0178 | 0.0243 |
| | IH = 0.075 | 0.0551 | 0.037 | 0.023 | 0.0181 | 0.016 | 0.0212 | 0.0259 |
| | IH = 0.15 | 0.1 | 0.1 | 0.082 | 0.0692 | 0.0456 | 0.0186 | 0.0051 |
| Embodiment 3 | IH = 0 | 0.0306 | 0.0317 | 0.0262 | 0.0221 | 0.0126 | 0.0188 | 0.0256 |
| | IH = 0.075 | 0.0476 | 0.0286 | 0.0188 | 0.0165 | 0.0155 | 0.0219 | 0.0269 |
| | IH = 0.15 | 0.0215 | 0.0815 | 0.0683 | 0.0627 | 0.0375 | 0.0152 | 0.0269 |

TABLE 3

(common to each embodiment)

| | | | | | |
|---|---|---|---|---|---|
| Φ ex | 9 | 9 | 9 | 9 | 9 |
| Φ em | 18 | 36 | 50 | 90 | 108 |
| Φ ex/Φ em | 2 | 4 | 5.5 | 10 | 12 |
| NAex | 0.1 | 0.1 | 0.1 | 0.1 | 0.1 |
| NAem | 0.1 | 0.1 | 0.2 | 0.2 | 0.2 |
| when λ x, λ em ≈ 400 nm | | | | | |
| 0.61 × (λ ex/Aex) | 2.4 | 2.4 | 2.4 | 2.4 | 2.4 |
| 0.61 × (λ em/NAem) | 2.4 | 2.4 | 1.2 | 1.2 | 1.2 |
| when λ x, λ em ≈ 000 nm | | | | | |
| 0.61 × (λ ex/NAex) | 6.1 | 6.1 | 6.1 | 6.1 | 6.1 |
| 0.61 × (λ em/NAem) | 6.1 | 6.1 | 3.1 | 3.1 | 3.1 |

INDUSTRIAL USEFULNESS

The laser scan type fluorescence microscope according to the present invention is very useful practically, since it is small sized and has a good operation performance, wherein observation of a sample in a state (in vivo) by using wavelength from a visible region to a near-infrared region can be carried out with high precision,

The invention claimed is:

1. A laser scan type fluorescence microscope comprising:
   laser light source section;
   an objective optical system constructed and arranged to condense excitation light from the laser light source section on a sample;
   a scanning device constructed and arranged to scan a surface of the sample with the excitation light from the laser light source section;
   a pupil projection lens arranged between the scanning device and the objective optical system; and
   a detection optical system for detecting fluorescence that emanates from the sample and passes the objective optical system and the pupil projection lens,
   wherein the objective optical system comprises an objective lens and an image forming lens for forming an intermediate image of the sample, wherein a back focal position of the objective lens is made conjugate with a position near the scanning device by the image forming lens and the pupil projection lens, and
   wherein the following condition is satisfied:

$0.15 \leq D/L \leq 0.5$ where D is a parfocal distance of the objective lens, and L is a distance from the surface of the sample to the position conjugate with the back focal position of the objective lens and located near the scanning device.

2. The laser scan type fluorescence microscope according to claim 1, further comprising an optical transmission member which leads the excitation light from the laser light source section to the scanning device.

3. The laser scan type fluorescence microscope according to claim 1, further comprising:
   a first multi-mode fiber which leads the excitation light from the laser light source section to the scanning device;
   a second multi-mode fiber which leads the fluorescence from the sample to the detection optical system;
   a first lens by which entry of the excitation light to the first multi-mode fiber is carried out; and
   a second lens by which entry of the fluorescence to the second multi-mode fiber is carried out,
   wherein the following conditions are satisfied:

$2 \leq \Phi em/\Phi ex \leq 12$ $0.61 \times (\lambda ex/NAex) < \Phi ex$ $0.61 \times (\lambda em/NAem) < \Phi em$ where Φex is a diameter of a core of the first multi-mode fiber, Φem is a diameter of a core of the second multi-mode fiber, NAex is a numerical aperture where entry of the excitation light to the first multi-mode fiber by the first lens is carried out, λex is a wavelength of the excitation light, NAem is a numerical aperture where entry of the fluorescence to the second multi-mode fiber by the second lens is carried out, and λem is a wavelength of the fluorescence.

4. The laser scan type fluorescence microscope according to claim 1, further comprising an optical transmission member which leads the fluorescence emanating from the sample and passing the pupil projection lens to the detection optical system.

5. The laser scan type fluorescence microscope according to claim 1, further comprising a light conducting optical system that leads the fluorescence from the sample to the detection optical system and leads the excitation light from the laser light source section to the scanning device.

6. The laser scan type fluorescence microscope according to claim 1, further comprising a first optical transmission member which leads the excitation light from the laser light source section to the scanning device, and a second optical transmission member which leads the fluorescence from the sample to the detection optical system.

7. The laser scan type fluorescence microscope according to claim 1, wherein the detection optical system is arranged in a main body of the microscope.

8. The laser scan type fluorescence microscope according to claim 1, further comprising:
   a first multi-mode fiber which leads the excitation light from the laser light source section to the scanning device;

a second multi-mode fiber which leads the fluorescence from the sample to the detection optical system;
a first lens by which entry of the excitation light to the first multi-mode fiber is carried out; and
a second lens by which entry of the fluorescence to the second multi-mode fiber is carried out,
wherein the following conditions are satisfied:

$$4 \leq \Phi em/\Phi ex \leq 10$$

$$0.61 \times (\lambda ex/NAex) < \Phi ex$$

$$0.61 \times (\lambda em/NAem) < \Phi em$$

where $\Phi ex$ is a diameter of a core of the first multi-mode fiber, $\Phi em$ is a diameter of a core of the second multi-mode fiber, NAex is a numerical aperture where entry of the excitation light to the first multi-mode fiber by the first lens is carried out, $\lambda ex$ is a wavelength of the excitation light, NAem is a numerical aperture where entry of the fluorescence to the second multi-mode fiber by the second lens is carried out, and $\lambda em$ is a wavelength of the fluorescence.

9. A laser scan type fluorescence microscope comprising:
a laser light source section;
an objective optical system constructed and arranged to condense excitation light from the laser light source section is condensed on a sample;
a scanning device constructed and arranged to scan a surface of the sample with the excitation light from the laser light source section;
a pupil projection lens arranged between the scanning device and the objective optical system; and
a detection optical system for detecting fluorescence that emanates from the sample and passes the objective optical system and the pupil projection lens,
wherein the objective optical system comprises an objective lens and an image forming lens for forming an intermediate image of the sample,
wherein a back focal position of the objective lens is made conjugate with a position near the scanning device by the image forming lens and the pupil projection lens,
wherein the following condition is satisfied:

$$0.15 \leq D/L \leq 0.5$$

where D is a parfocal distance of the objective lens, and L is a distance from the surface of the sample to the position conjugate with the back focal position of the objective lens and located near the scanning device,
wherein the pupil projection lens comprises a plurality of lens components, and is configured so that, of lens surfaces thereof, a lens surface arranged nearest the scanning device is concave toward a scanning device side and a lens surface arranged nearest the intermediate image is concave toward an intermediate image side, and
wherein the following condition is satisfied:

$$0.2 \leq Fe/D3 \leq 0.5$$

where D3 is a distance from a position conjugate with a pupil position of the objective lens and located near the scanning device to a position of the intermediate image formed by the image forming lens, and Fe is a focal length of the pupil projection lens.

10. A laser scan type fluorescence microscope comprising:
a laser light source section;
an objective optical system constructed and arranged to condense excitation light from the laser light source section on a sample;
a scanning device for scanning a surface of the sample with the excitation light from the laser light source section;
a pupil projection lens arranged between the scanning device and the objective optical system; and
a detection optical system for detecting fluorescence that emanates from the sample and passes the objective optical system and the pupil projection lens,
wherein the objective optical system comprises an objective lens and an image forming lens for forming an intermediate image of the sample,
wherein a back focal position of the objective lens is made conjugate with a position near the scanning device by the image forming lens and the pupil projection lens,
wherein the following condition is satisfied:

$$0.15 \leq D/L \leq 0.5$$

where D is a parfocal distance of the objective lens, and L is a distance from the surface of the sample to the position conjugate with the back focal position of the objective lens and located near the scanning means, and
wherein the laser scanning confocal fluorescence microscope is composed of a plurality of lens groups, comprises at least one cemented lens having a positive lens element and a negative lens element, and satisfies the following conditions:

$$0.4 \leq FTL/D1 \leq 1$$

$$80 < vp$$

where vp is Abbe's number of the positive lens element in the cemented lens, FTL is a focal length of the image forming lens, and D1 is a distance from an objective lens shoulder on a main body of the microscope to a position of the intermediate image.

11. A laser scan type fluorescence microscope comprising:
a laser light source section;
an objective optical system constructed and arranged to condense excitation light from the laser light source section on a sample;
a scanning device constructed and arranged to scan a surface of the sample with the excitation light from the laser light source section;
a pupil projection lens arranged between the scanning device and the objective optical system; and
a detection optical system for detecting fluorescence that emanates from the sample and passes the objective optical system and the pupil projection lens,
wherein the objective optical system comprises an objective lens and an image forming lens for forming an intermediate image of the sample,
wherein a back focal position of the objective lens is made conjugate with a position near the scanning device by the image forming lens and the pupil projection lens,
wherein the following condition is satisfied:

$$0.15 \leq D/L \leq 0.5$$

where D is a parfocal distance of the objective lens, and L is a distance from the surface of the sample to the position conjugate with the back focal position of the objective lens and located near the scanning device, and
wherein the image forming lens comprises two lens groups that are a front group arranged on an intermediate image side and a rear group arranged on an objective lens side, the front group of the image forming lens has at least one negative lens element, and the following conditions are satisfied:

$0.4 \leq D2/FTL \leq 1$ $0.7 \leq FTL1/FTL \leq 1.5$ where FTL is a focal length of the image forming lens, FTL1 is a focal length of the rear group of the image forming lens, and D2 is an interval between the front group of the image forming lens and the rear group of the image forming lens.

12. The laser scan type fluorescence microscope according to any one of claims 9, 10 and 11, wherein the objective lens is a submerged type objective lens.

13. The laser scan type fluorescence microscope according to any one of claims 9, 10 and 11, wherein the laser light source section includes a semiconductor laser.

* * * * *

UNITED STATES PATENT AND TRADEMARK OFFICE
CERTIFICATE OF CORRECTION

PATENT NO.      : 7,589,891 B2                                          Page 1 of 1
APPLICATION NO. : 10/579975
DATED           : September 15, 2009
INVENTOR(S)     : Kenji Kawasaki It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 314 days.

Signed and Sealed this

Twenty-first Day of September, 2010

David J. Kappos
*Director of the United States Patent and Trademark Office*